US009543887B2

United States Patent
Hatakeyama et al.

(10) Patent No.: US 9,543,887 B2
(45) Date of Patent: Jan. 10, 2017

(54) HEAT PUMP DEVICE, HEAT PUMP SYSTEM, AND METHOD FOR CONTROLLING THREE-PHASE INVERTER

(75) Inventors: Kazunori Hatakeyama, Tokyo (JP); Takuya Shimomugi, Tokyo (JP); Shinya Matsushita, Tokyo (JP); Naoki Wakuta, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 641 days.

(21) Appl. No.: 13/876,450

(22) PCT Filed: Oct. 15, 2010

(86) PCT No.: PCT/JP2010/068112
§ 371 (c)(1),
(2), (4) Date: Mar. 27, 2013

(87) PCT Pub. No.: WO2012/049763
PCT Pub. Date: Apr. 19, 2012

(65) Prior Publication Data
US 2013/0180273 A1  Jul. 18, 2013

(51) Int. Cl.
*F04B 35/04* (2006.01)
*H02P 31/00* (2006.01)
(Continued)

(52) U.S. Cl.
CPC ............... *H02P 31/00* (2013.01); *F04B 35/04* (2013.01); *F04B 39/06* (2013.01); *F25B 49/025* (2013.01);
(Continued)

(58) Field of Classification Search
CPC . F25B 49/025; F25B 2500/13; F25B 2500/26; F25B 2600/021
See application file for complete search history.

(56) References Cited

U.S. PATENT DOCUMENTS 5,195,327 A   3/1993  Kim
5,857,349 A * 1/1999  Hamaoka ................. H02P 6/20
                                                62/158
(Continued)

FOREIGN PATENT DOCUMENTS

DE   42 05 918 A1    8/1992
EP   1978628 A2    10/2008
(Continued)

OTHER PUBLICATIONS

International Search Report of the International Searching Authority (JPO) mailed on Dec. 28, 2010 in the corresponding PCT international patent application No. PCT/JP2010/068112 (and English translation).
(Continued)

*Primary Examiner* — Patrick Hamo
(74) *Attorney, Agent, or Firm* — Posz Law Group, PLC

(57) ABSTRACT

A selection unit switches between a phase θp and a phase θn different from the phase θp substantially by 180 degrees, and outputs one of them in synchronization with a carrier signal. A voltage-command generation unit generates and outputs three-phase voltage command values Vu*, Vv* and Vw* based on the phase outputted by the selection unit. A PWM-signal generation unit generates three-phase voltage command values Vu*', Vv*' and Vw*' by correcting the three-phase voltage command values Vu*, Vv* and Vw* outputted by the voltage-command generation unit according to a predetermined method, and generates six drive signals corresponding to switching elements of the inverter based on the three-phase voltage command values Vu*',
(Continued)

Vv*' and Vw*' and the carrier signal. The PWM-signal generation unit outputs the generated drive signals to the corresponding switching elements of the three-phase inverter, to cause the inverter to generate a high-frequency AC voltage.

15 Claims, 22 Drawing Sheets

(51) Int. Cl.
    *F04B 39/06* (2006.01)
    *F25B 49/02* (2006.01)
    *H02M 7/5387* (2007.01)
(52) U.S. Cl.
    CPC .... *H02M 7/53875* (2013.01); *F25B 2600/021* (2013.01); *H02M 2007/53876* (2013.01); *Y02B 30/741* (2013.01)

(56) References Cited

U.S. PATENT DOCUMENTS

| | | | |
|---|---|---|---|
| 6,388,416 | B1 | 5/2002 | Nakatani et al. |
| 6,958,589 | B2 | 10/2005 | Kawaji et al. |
| 8,232,751 | B2* | 7/2012 | Iwaji ............... H02P 6/187 318/400.02 |
| 8,616,016 | B2 | 12/2013 | Asano et al. |
| 8,944,777 | B2 | 2/2015 | Sakanobe et al. |
| 9,263,984 | B2* | 2/2016 | Hatakeyama ....... F04C 29/0085 |
| 2005/0050908 | A1 | 3/2005 | Lee et al. |
| 2005/0099743 | A1 | 5/2005 | Lee |
| 2008/0041081 | A1 | 2/2008 | Tolbert |
| 2008/0223059 | A1* | 9/2008 | Escanes Garcia .... F25B 49/025 62/230 |
| 2011/0083467 | A1* | 4/2011 | Asano ............... H02P 21/0089 62/498 |
| 2011/0141777 | A1* | 6/2011 | Sakakibara ......... H02M 5/4585 363/69 |
| 2011/0256005 | A1* | 10/2011 | Takeoka ................ H02P 6/18 417/415 |
| 2012/0096881 | A1* | 4/2012 | Sakanobe ............. F25B 49/025 62/126 |
| 2013/0152609 | A1 | 6/2013 | Hatakeyama et al. |
| 2013/0180273 | A1 | 7/2013 | Hatakeyama et al. |

FOREIGN PATENT DOCUMENTS

| | | | |
|---|---|---|---|
| EP | 2 306 105 | A1 | 4/2011 |
| EP | 2 461 123 | A1 | 6/2012 |
| EP | 2 613 106 | A1 | 7/2013 |
| EP | 2 629 029 | A1 | 8/2013 |
| JP | S60-068341 | A | 4/1985 |
| JP | S61-091445 | A | 9/1986 |
| JP | H08-226714 | A | 3/1996 |
| JP | 08-223989 | A | 8/1996 |
| JP | H11-159467 | A | 6/1999 |
| JP | 11-275869 | A | 10/1999 |
| JP | 11324934 | A | 11/1999 |
| JP | 2004-320985 | A | 11/2004 |
| JP | 2006-118731 | A | 5/2006 |
| JP | 2007-259629 | A | 10/2007 |
| JP | 2007-336634 | A | 12/2007 |
| JP | 2008-057870 | A | 3/2008 |
| JP | 2008-259343 | A | 10/2008 |
| JP | 2009-106036 | A | 5/2009 |
| JP | 2010-051090 | A | 3/2010 |
| JP | 2010-074898 | A | 4/2010 |
| JP | 2011038689 | A * | 2/2011 |
| WO | WO9929035 | A1 | 6/1999 |
| WO | 2009/151033 | A1 | 12/2009 |
| WO | WO2010021226 | A1 | 2/2010 |
| WO | WO2010082472 | A1 | 7/2010 |
| WO | WO2011013277 | A1 | 2/2011 |

OTHER PUBLICATIONS

Office Action dated Apr. 16, 2015 issued in corresponding CN patent application No. 201080069552.8 (and English translation).
Extended European Search Report dated Jan. 23, 2015 issued in corresponding EP patent application No. 11864246.1.
International Search Report of the International Searching Authority mailed Jun. 28, 2011 for the related international application No. PCT/JP2011/060396 (with English translation).
International Search Report of the International Searching Authority mailed Mar. 8, 2011 for the corresponding international application No. PCT/JP2010/073007 (with English translation).
Extended European Search Report dated Apr. 2, 2014 issued in corresponding EP patent application No. 10858413.7.
Office Action mailed Jan. 21, 2014 issued in corresponding JP patent application No. 2013-511846 (and English translation).
Extended European Search Report dated Dec. 3, 2015 issued in corresponding EP patent application No. 10861140.1.
Office Action dated Apr. 26, 2016 issued in co-pending U.S. Appl. No. 13/996,095.

* cited by examiner

FIG.5

| VOLTAGE VECTOR | VOLTAGE DIRECTION | UP | VP | WP | UN | VN | WN |
|---|---|---|---|---|---|---|---|
| V0 | 0  | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | −U | 0 | 1 | 1 | 1 | 0 | 0 |
| V4 | +U | 1 | 0 | 0 | 0 | 1 | 1 |
| V5 | −V | 1 | 0 | 1 | 0 | 1 | 0 |
| V6 | −W | 1 | 1 | 0 | 0 | 0 | 1 |
| V7 | 0  | 1 | 1 | 1 | 0 | 0 | 0 |

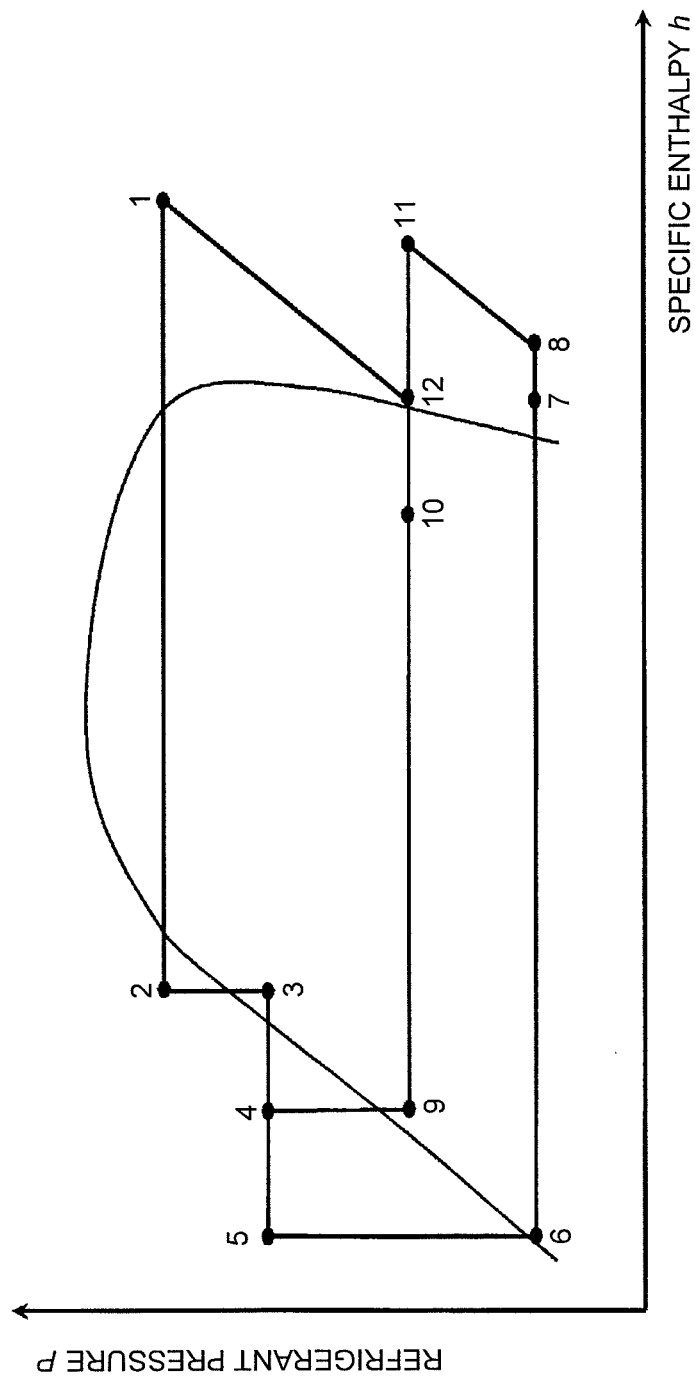

ical Problem

HEAT PUMP DEVICE, HEAT PUMP SYSTEM, AND METHOD FOR CONTROLLING THREE-PHASE INVERTER

CROSS REFERENCE TO RELATED APPLICATIONS

This application is a U.S. national stage application of PCT/JP2010/068112 filed on Oct. 15, 2010.

FIELD

The present invention relates to a heating method of a compressor used in a heat pump device.

BACKGROUND

In Patent Literature 1, there is a description of causing a faint high-frequency open-phase current to flow to a winding of a motor to warm the motor winding when the amount of a liquid refrigerant retained in a compressor reaches a predetermined value or higher. Accordingly, breakage failure of the compressor is prevented by preventing liquid compression due to starting of an operation in a state where a liquid refrigerant is retained in the compressor.

In Patent Literature 2, there is a description of controlling an on/off cycle of a switching element to periodically reverse a direction of a current flowing to a stator coil of a motor. With this technique, not only heat generation due to ohmic loss but also heat generation due to hysteresis loss is performed so that sufficient preheating can be performed with a less consumption current, thereby improving the power efficiency.

CITATION LIST

Patent Literatures

Patent Literature 1: Japanese Patent Application Laid-open No. 8-226714
Patent Literature 2: Japanese Patent Application Laid-open No. 11-159467

SUMMARY

Technical Problem

In the technique described in Patent Literature 1, because an open-phase current is caused to flow, there is caused a winding to which a current does not flow, and thus the compressor can not be uniformly heated. Furthermore, when an open-phase current is caused to flow to a permanent magnet synchronous motor having a saliency ratio using an inverter, the winding inductance depends on a rotor position. Therefore, the current may flow to all phases depending on the rotor position, and thus it is difficult to cause an open-phase current to flow.

In the technique described in Patent Literature 2, any one of switching elements each having one end connected to a power supply side is repeatedly switched on/off for a predetermined number of times during a predetermined period of time. At the same time, any two of switching elements each having one end connected to an earth side are switched on for the predetermined period of time, and then operation is made so that the current flowing to the stator coil is turned in the reversed direction. Due to this configuration, the current flowing to the winding can not be made to have a higher frequency, and thus there is a limitation in generation of iron loss due to a higher frequency and the efficiency can not be improved. In addition, noise is generated in this technique.

An object of the present invention is to efficiently heat a refrigerant retained in a compressor.

Solution to Problem

A heat pump device according to the invention comprising:

a compressor having a compression mechanism for compressing a refrigerant;

a motor that actuates the compression mechanism of the compressor;

a three-phase inverter that applies a predetermined voltage to the motor and is configured to parallel-connect three serial connection parts each having two switching elements; and an inverter control unit that controls the three-phase inverter to cause the three-phase inverter to generate a high-frequency AC voltage, wherein the inverter control unit includes:

a phase switching unit that switches between a phase θp and a phase θn different from the phase θp substantially by 180 degrees and outputs one of them, in synchronization with a reference signal having a predetermined frequency;

a voltage-command generation unit that generates and outputs three-phase voltage command values Vu*, Vv* and Vw* based on the phase outputted by the phase switching unit;

a voltage-command correction unit that generates and outputs three-phase voltage command values Vu*', Vv*' and Vw*' by correcting the three-phase voltage command values Vu*, Vv* and Vw* outputted by the voltage-command generation unit according to a predetermined method; and a drive-signal generation unit that generates six drive signals corresponding to the respective switching elements of the three-phase inverter based on the three-phase voltage command values Vu*', Vv*' and Vw*' outputted by the voltage-command correction unit and the reference signal, and outputs the generated drive signals to the corresponding switching elements of the three-phase inverter, to cause the three-phase inverter to generate a high-frequency AC voltage.

Advantageous Effects of Invention

The heat pump device according to the present invention generates a drive signal based on a phase θp and a phase θn that are switched and outputted in synchronization with a reference signal. Therefore, a high-frequency voltage having a high waveform output accuracy can be generated, and a refrigerant retained in a compressor can be efficiently heated while restraining generation of noise.

Furthermore, the heat pump device according to the present invention generates voltage command values Vu*', Vv*' and Vw*' by correcting Vu*, Vv* and Vw* outputted by a voltage-command generation unit based on the reference signal. Therefore, shaft vibrations due to DC excitation can be prevented.

BRIEF DESCRIPTION OF DRAWINGS

FIG. 5 is a chart showing eight switching patterns in the first embodiment.

FIG. 22 is a Mollier chart of a state of a refrigerant of the heat pump device 100 shown in FIG. 21.

DESCRIPTION OF EMBODIMENTS

First Embodiment

In a first embodiment, a basic configuration and operations of a heat pump device 100 are explained.

Figure 1:
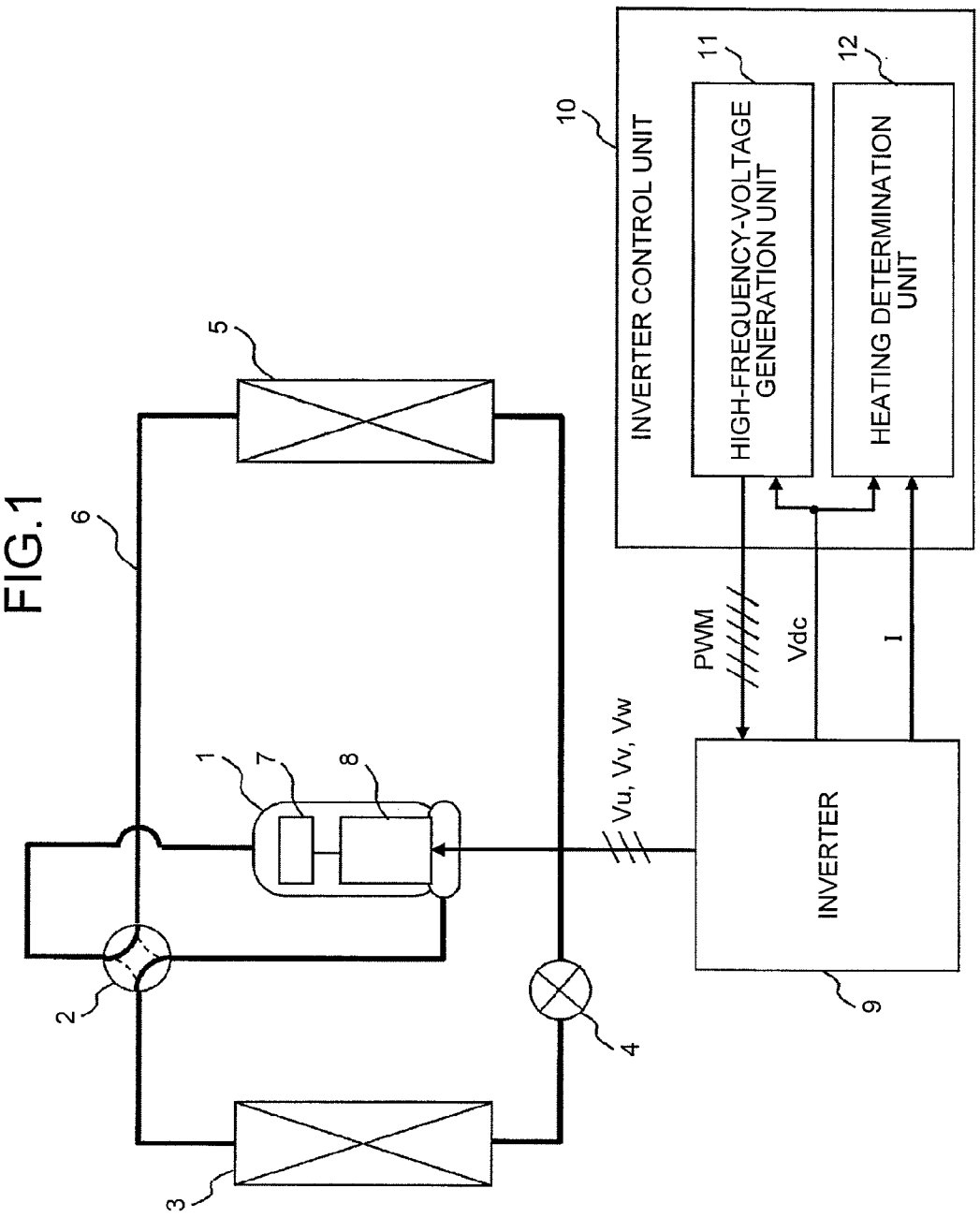
FIG. 1 is a diagram showing a configuration of a heat pump device 100 according to a first embodiment.

FIG. 1 is a diagram showing a configuration of the heat pump device 100 according to the first embodiment.

The heat pump device 100 according to the first embodiment includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7 that compresses a refrigerant and a motor 8 that actuates the compression mechanism 7 are provided in the compressor 1. The motor 8 is a three-phase motor including windings of three phases (U-phase, V-phase, and W-phase).

An inverter 9 that applies a voltage to the motor 8 to drive it is electrically connected to the motor 8. The inverter 9 applies voltages Vu, Vv and Vw to the U-phase, the V-phase and the W-phase windings of the motor 8, respectively.

The inverter 9 is electrically connected with an inverter control unit 10 including a high-frequency-voltage generation unit 11 and a heating determination unit 12. The inverter control unit 10 determines whether the motor 8 needs to be heated based on a value of a bus voltage Vdc that is a power supply voltage of the inverter 9, transmitted from the inverter 9, and a value of a current I flowing to the motor 8. When the motor 8 needs to be heated, the inverter control unit 10 outputs a PWM (Pulse Width Modulation) signal (drive signal) to the inverter 9.

Figure 2:
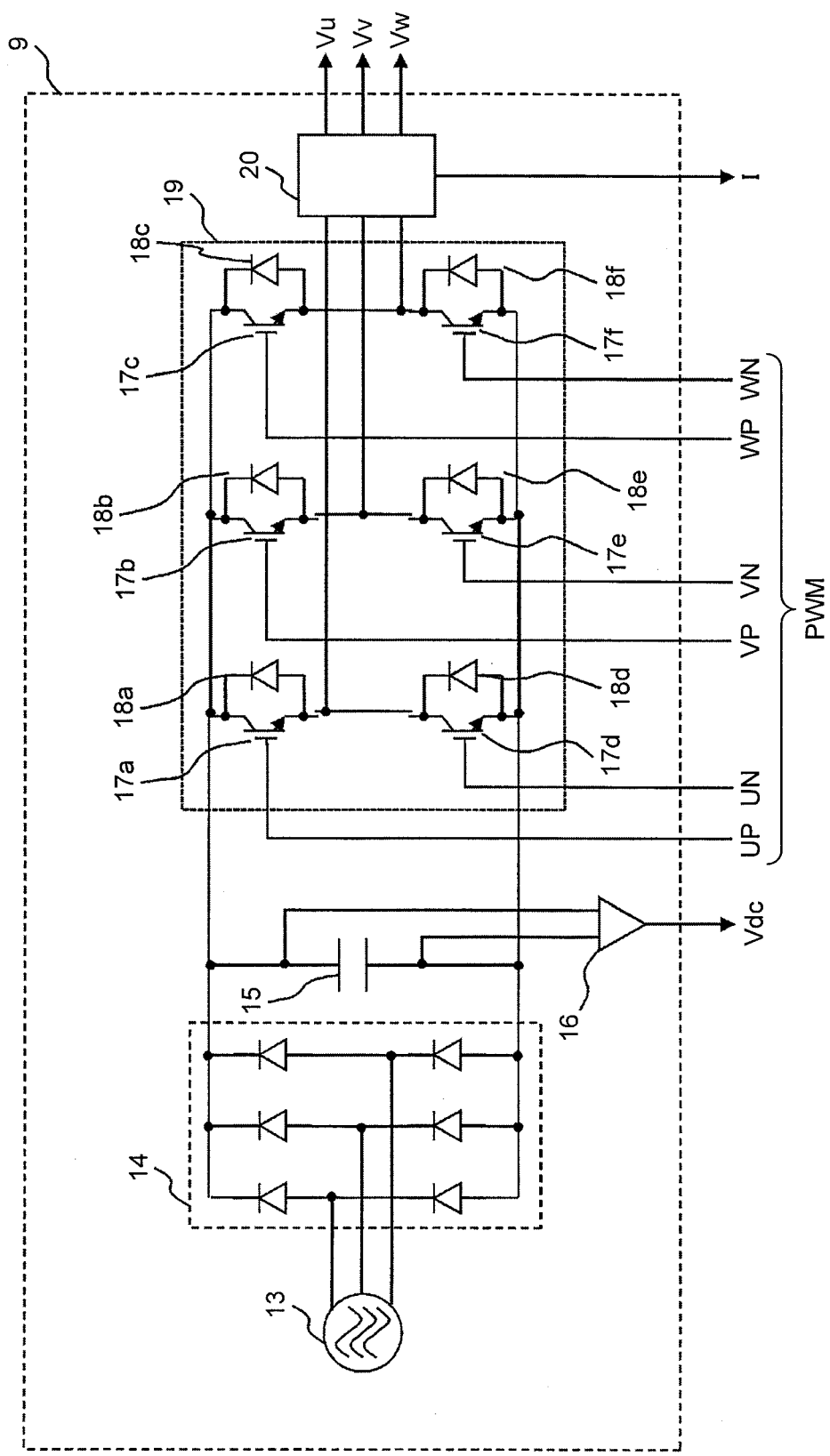
FIG. 2 is a diagram showing a configuration of an inverter 9 according to the first embodiment.

FIG. 2 is a diagram showing a configuration of the inverter 9 according to the first embodiment.

The inverter 9 includes an AC power supply 13, a rectifier 14 that rectifies a voltage supplied from the AC power supply 13, a smoothing capacitor 15 that smoothes the voltage rectified by the rectifier 14 to generate a DC voltage (bus voltage Vdc), and a bus-voltage detection unit 16 that detects the bus voltage Vdc generated by the smoothing capacitor 15 and outputs the bus voltage to the inverter control unit 10.

The inverter 9 has a voltage application unit 19 using the bus voltage Vdc as a power supply. The voltage application unit 19 is a circuit in which three series connection portions of two switching elements (17a and 17d, 17b and 17e, and 17c and 17f) are connected in parallel, and reflux diodes 18a to 18f that are connected in parallel to the respective switching elements 17a to 17f are provided. The voltage application unit 19 drives the respective switching elements in accordance with PWM signals UP, VP, WP, UN, VN and WN, respectively, transmitted from the inverter control unit 10 (17a driven by UP, 17b driven by VP, 17c driven by WP, 17d driven by UN, 17e driven by VN, and 17f driven by WN). The voltage application unit 19 applies the voltages Vu, Vv and Vw according to the driven switching elements 17 to the U-phase, V-phase and W-phase windings of the motor 8, respectively.

Furthermore, the inverter 9 includes a current detection unit 20 that detects the current I flowing from the inverter 9 to the motor 8 by applying the voltages Vu, Vv and Vw to the U-phase, V-phase and W-phase windings of the motor 8, respectively, to output the current I to the inverter control unit 10.

Figure 3:
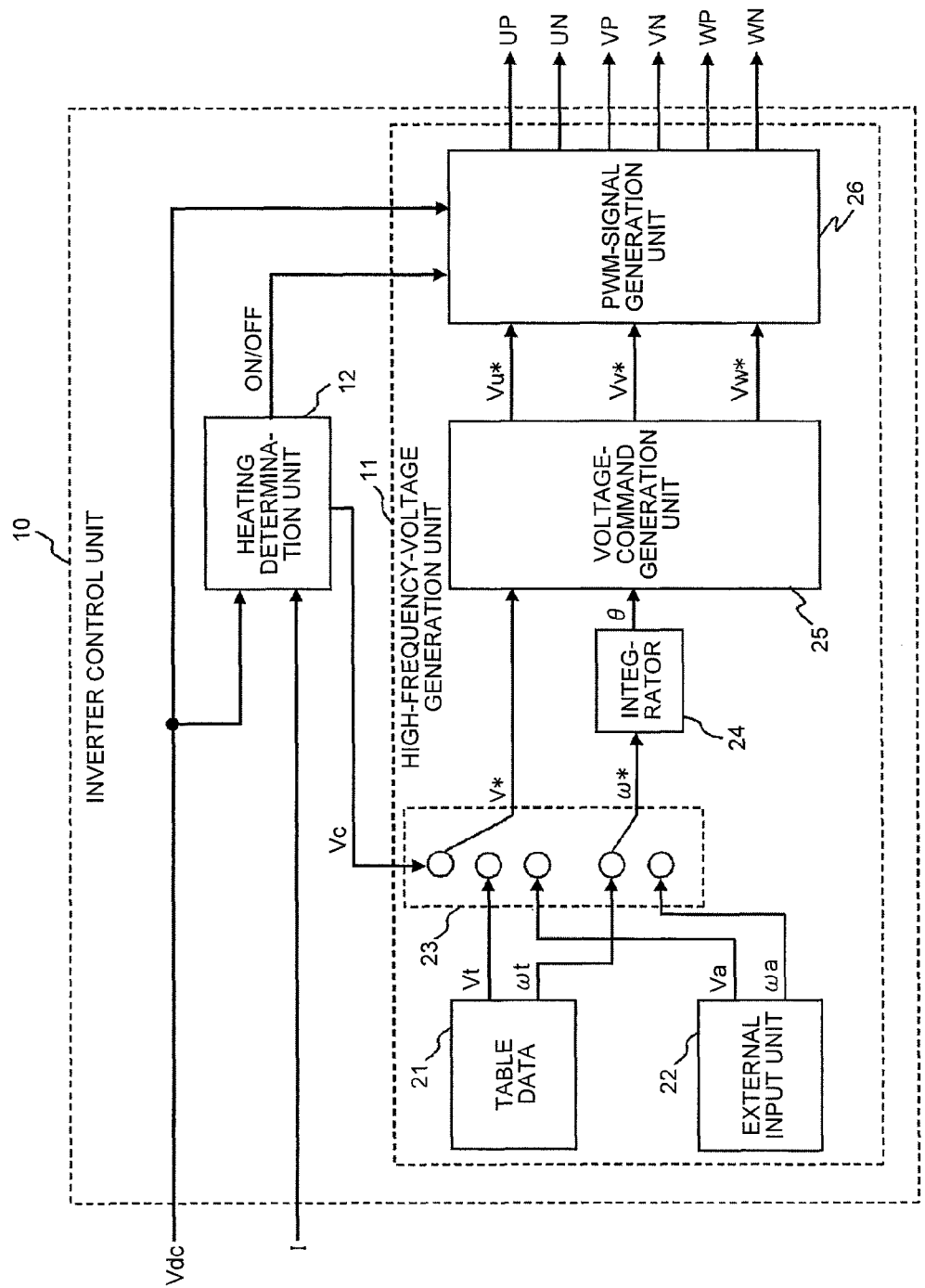
FIG. 3 is a diagram showing a configuration of an inverter control unit 10 according to the first embodiment.

FIG. 3 is a diagram showing a configuration of the inverter control unit 10 according to the first embodiment.

As described above, the inverter control unit 10 includes the high-frequency-voltage generation unit 11 and the heating determination unit 12. The heating determination unit 12 is explained later, and the high-frequency-voltage generation unit 11 is explained here.

The high-frequency-voltage generation unit 11 includes table data 21, an external input unit 22, a selection unit 23, an integrator 24, a voltage-command generation unit 25, and a PWM-signal generation unit 26.

The selection unit 23 selects and outputs any one of a voltage command value Vc outputted from the heating determination unit 12, a voltage command value ωt recorded in the table data 21, and a voltage command value ωa inputted from the external input unit 22 as a voltage command value V*. The selection unit 23 also selects and outputs either a rotation-speed command value ωt recorded in the table data 21 or a rotation-speed command value ωa inputted from the external input unit 22 as a rotation-speed command value ω*.

The integrator 24 obtains a voltage phase θ based on the rotation-speed command value ω* outputted by the selection unit 23.

The voltage-command generation unit 25 generates and outputs voltage command values Vu*, Vv* and Vw* using the voltage command value V* outputted by the selection unit 23 and the voltage phase θ obtained by the integrator 24 as inputs thereto.

The PWM-signal generation unit 26 generates the PWM signals (UP, VP, WP, UN, VN and WN) based on the voltage command values Vu*, Vv* and Vw* outputted by the voltage-command generation unit 25 and the bus voltage Vdc, and outputs the PWM signals to the inverter 9.

Now, description is made for a generation method of generating the voltage command values Vu*, Vv* and Vw* in the voltage-command generation unit 25 and a method of generating the PWM signal in the PWM-signal generation unit 26.

Figure 4:
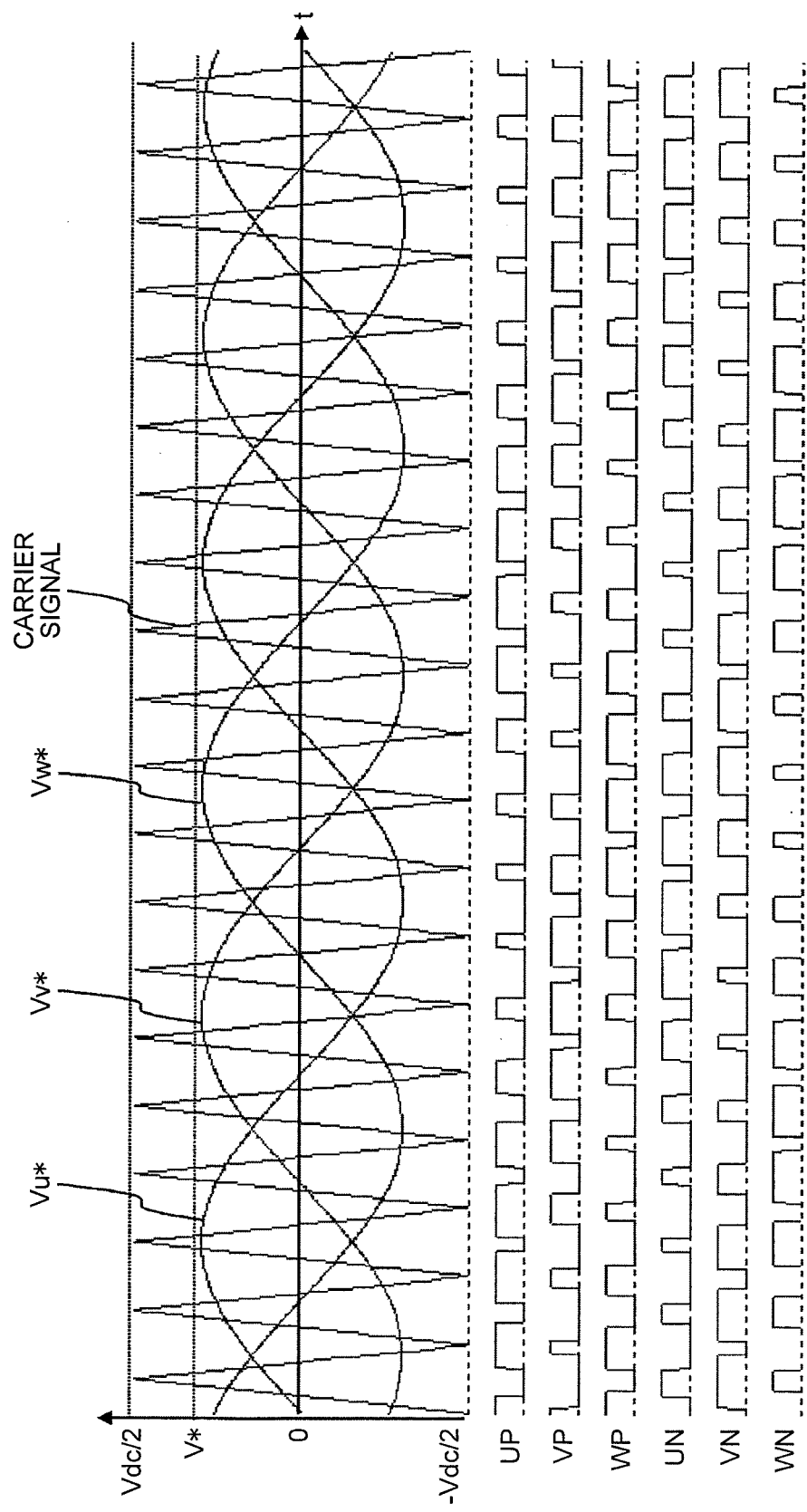
FIG. 4 is a diagram showing input/output waveforms of a PWM-signal generation unit 26 in the first embodiment.

FIG. 4 is a chart showing input/output waveforms of the PWM-signal generation unit 26 according to the first embodiment.

For example, the voltage command values Vu*, Vv* and Vw* are defined as cosine waves (sine waves) having phases different by 2π/3 as shown in Equations (1) to (3). Herein, V* denotes an amplitude of the voltage command value, and θ denotes a phase of the voltage command value.

$$Vu^* = V^* \cos\theta \quad (1)$$

$$Vv^* = V^* \cos(\theta - (2/3)\pi) \quad (2)$$

$$Vw^* = V^* \cos(\theta + (2/3)\pi) \quad (3)$$

The voltage-command generation unit 25 calculates the voltage command values Vu*, Vv* and Vw* according to Equations (1) to (3) based on the voltage command value V* outputted by the selection unit 23 and the voltage phase θ obtained by the integrator 24, and outputs the calculated voltage command values Vu*, Vv* and Vw* to the PWM-signal generation unit 26. The PWM-signal generation unit 26 compares the voltage command values Vu*, Vv* and Vw* with a carrier signal (reference signal) having an amplitude Vdc/2 at a predetermined frequency, and generates PWM signals UP, VP, WP, UN, VN and WN based on a magnitude relation to each other.

For example, when the voltage command value Vu* is larger than the carrier signal, UP is set to a voltage for turning on the switching element 17a, and UN is set to a voltage for turning off the switching element 17d. On the other hand, when the voltage command value Vu* is smaller than the carrier signal, inversely, UP is set to a voltage for turning off the switching element 17a, and UN is set to a voltage for turning on the switching element 17d. The same applies to other signals, and VP and VN are determined based on the comparison between the voltage command value Vv* and the carrier signal, and WP and WN are determined based on the comparison between the voltage command value Vw* and the carrier signal.

In a case of a general inverter, because a complementary PWM system is adopted therefore, UP and UN, VP and VN, and WP and WN have an inverse relationship to each other. Therefore, there are eight switching patterns in total.

FIG. 5 is a chart showing eight switching patterns in the first embodiment. In FIG. 5, reference symbols V0 to V7 denote voltage vectors generated in the respective switching patterns. The voltage direction of the respective voltage vectors is indicated by ±U, ±V and ±W (and 0 when the voltage is not generated). Here, "+U" means a voltage for generating a current in the U-phase direction, which flows into the motor 8 via the U-phase and flows out from the motor 8 via the V-phase and the W-phase, and "−U" means a voltage for generating a current in the −U phase direction, which flows into the motor 8 via the V-phase and the W-phase and flows out from the motor 8 via the U-phase. The same applies to ±V and ±W.

The inverter 9 can be caused to output desired voltages by combining the switching patterns shown in FIG. 5 and outputting a voltage vector. At this time, a high frequency voltage can be outputted by changing the phase θ at a high speed.

The voltage command signals Vu*, Vv* and Vw* may be obtained in two-phase modulation, triple harmonic superimposition modulation, space vector modulation, and the like other than Equations (1) to (3).

Figure 6:
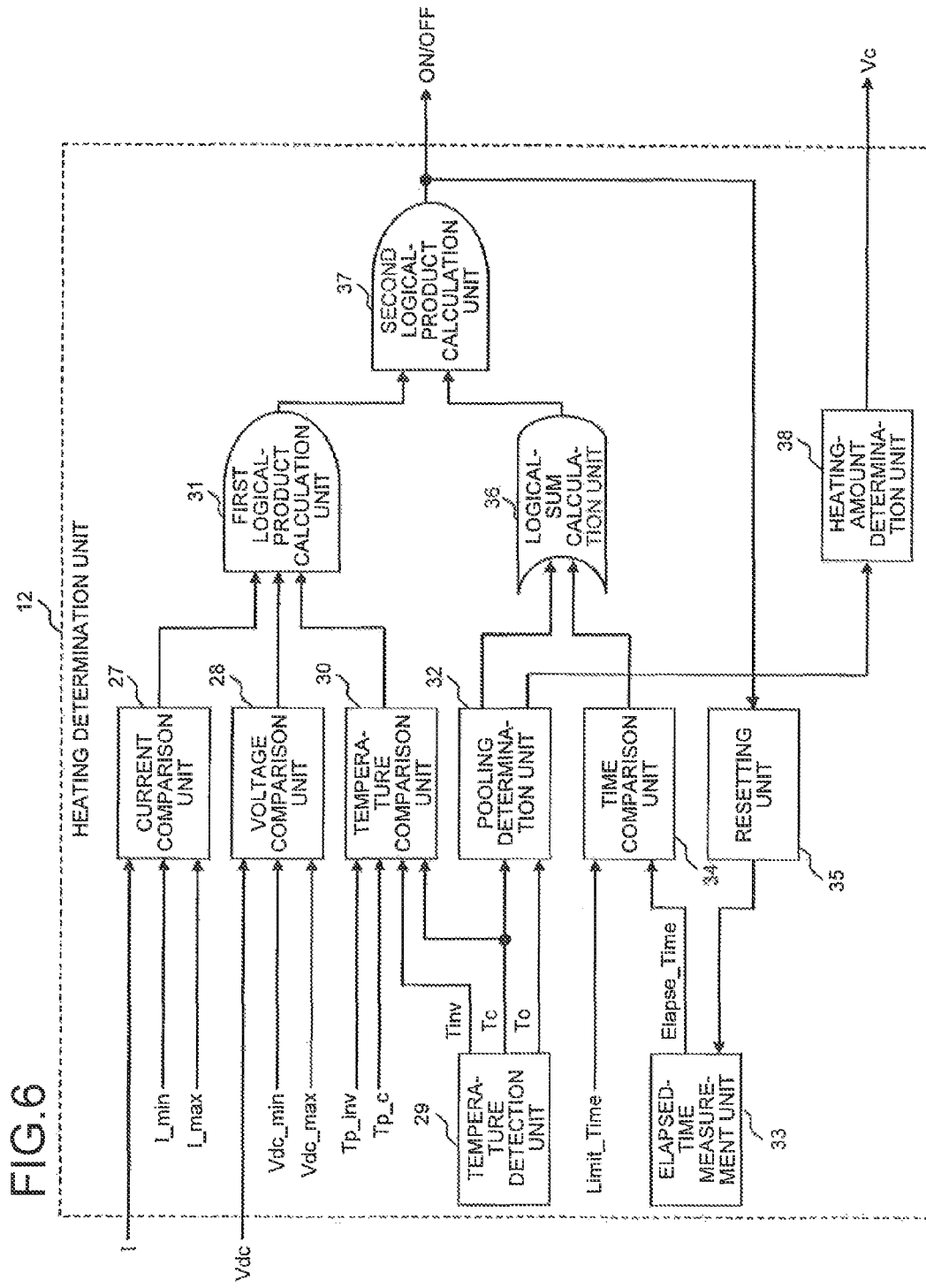
FIG. 6 is a diagram showing a configuration of a heating determination unit 12 in the first embodiment.

FIG. 6 is a diagram showing a configuration of the heating determination unit 12 according to the first embodiment.

The heating determination unit 12 controls an operation state (ON/OFF) of the high-frequency-voltage generation unit 11 based on the bus voltage Vdc detected by the bus-voltage detection unit 16 of the inverter 9, the current I detected by the current detection unit 20 of the inverter 9, and the like.

The heating determination unit 12 includes a current comparison unit 27, a voltage comparison unit 28, a temperature detection unit 29, a temperature comparison unit 30, a first logical-product calculation unit 31, a pooling determination unit 32, an elapsed-time measurement unit 33, a time comparison unit 34, a resetting unit 35, a logical-sum calculation unit 36, a second logical-product calculation unit 37, and a heating-amount determination unit 38.

The current comparison unit 27 output "1" with judging that it is a normal state when the current I detected and outputted by the current detection unit 20 is in a state of Imin<I<Imax, but outputs "0" when not in the state.

The Imax is an upper limit of the current, and the Imin is a lower limit of the current. When an excessive positive current equal to or larger than the Imax or an excessive negative current equal to or smaller than the Imin flows, the current comparison unit 27 determines that the current I is in an abnormal state and outputs "0", thereby operating to stop heating.

The voltage comparison unit 28 determines that the bus voltage Vdc is in a normal state when the bus voltage Vdc detected by the bus-voltage detection unit 16 is in a state of Vdc_min<Vdc<Vdc_max and outputs "1", but outputs "0" in other cases.

The Vdc_max is an upper limit of the bus voltage, and the Vdc_min is a lower limit of the bus voltage. In the case of an excessive high bus voltage equal to or higher than the Vdc_max or an excessive low bus voltage equal to or lower than the Vdc_min, the voltage comparison unit 28 determines that the bus voltage is in an abnormal state and outputs "0", thereby operating to stop heating.

The temperature detection unit 29 detects an inverter temperature Tinv that is a temperature of the voltage application unit 19, a temperature Tc of the compressor 1, and an outside air temperature To.

The temperature comparison unit 30 compares a preset protective temperature Tp_inv of the inverter with the inverter temperature Tinv, and compares a preset protective temperature Tp_c of the compressor 1 with the compressor temperature Tc. The temperature comparison unit 30 determines that a normal operation is currently performed in a state of Tp_inv>Tinv and in a state of Tp_c>Tc and outputs "1", but outputs "0" in other cases.

In a case of Tp_inv<Tinv, the inverter temperature is high, and in a case of Tp_c<Tc, the winding temperature of the motor 8 in the compressor 1 is high, and so an insulation failure or the like may occur. Therefore, the temperature comparison unit 30 determines that it is dangerous, outputs "0", and operates to stop the heating. The Tp_c needs to be set, taking into consideration a fact that the compressor 1 has a larger heat capacity than the winding of the motor 8 and the temperature rising speed is lower than that of the winding.

The first logical-product calculation unit 31 outputs a logical product of output values of the current comparison unit 27, the voltage comparison unit 28 and the temperature comparison unit 30. When any one or more of the output values of the current comparison unit 27, the voltage comparison unit 28 and the temperature comparison unit 30 is 0, which indicates an abnormal state, the first logical-product calculation unit 31 outputs "0" to operate to stop the heating.

A method of stopping heating using the current I, the bus voltage Vdc, and the temperatures Tinv and Tc has been explained. However, not all of these values need to be used. Heating may be stopped using a parameter other than these values.

Subsequently, the pooling determination unit 32 determines whether or not a liquid refrigerant is retained in the compressor 1 (the refrigerant is pooled) based on the temperature Tc of the compressor 1 and the outside air temperature To detected by the temperature detection unit 29.

Because the compressor 1 has the largest heat capacity in the refrigeration cycle, and the compressor temperature Tc rises slower compared to the rise of the outdoor air temperature To, the temperature thereof becomes the lowest. Because the refrigerant stays in a place where the temperature is the lowest in the refrigeration cycle, and accumulates as the liquid refrigerant, the refrigerant accumulates in the compressor 1 at the time of temperature rise. In a case of To>Tc, the pooling determination unit 32 determines that the refrigerant stays in the compressor 1, outputs "1" to start heating, and stops the heating when To<Tc.

Control may be executed to start heating when the Tc is in a rising trend or when the To is in a rising trend, and when detection of the Tc or To becomes difficult, the control can be realized using either one of them, thereby enabling to realize highly reliable control.

When both the compressor temperature Tc and the external temperature To can not be detected, heating of the compressor 1 may be impossible. Therefore, the elapsed-time measurement unit 33 measures a time for which the compressor 1 is not heated (Elapse_Time). When a time limit time Limit_Time preset by the time comparison unit 34 is exceeded, the elapsed-time measurement unit 33 outputs "1" to start heating of the compressor 1. Because the temperature change in a day is such that temperature rises from morning when the sun rises toward daytime, and temperature drops from evening toward night, temperature rise and drop are repeated in a cycle of roughly 12 hours. For this reason, for example, the Limit_Time may be set to about 12 hours.

The Elapse_Time is set to "0" by the resetting unit 35, when the heating of the compressor 1 is executed.

The logical-sum calculation unit 36 outputs a logical sum of output values of the pooling determination unit 32 and the time comparison unit 34. When at least one of the output values of the pooling determination unit 32 and the time comparison unit 34 becomes "1" indicating starting of the heating, the logical-sum calculation unit 36 outputs "1" to start heating of the compressor "1".

The second logical-product calculation unit 37 outputs a logical product of the output values of the first logical-product calculation unit 31 and the logical-sum calculation unit 36 as an output value of the heating determination unit 12. When the output value is 1, the high-frequency-voltage generation unit 11 is actuated to perform a heating operation of the compressor 1. On the other hand, when the output value is 0, the high-frequency-voltage generation unit 11 is not actuated, and the heating operation of the compressor 1 is not performed, or the operation of the high-frequency-voltage generation unit 11 is stopped to stop the heating operation of the compressor 1.

Because the second logical-product calculation unit 37 outputs the logical product, when a signal "0" for stopping heating of the compressor 1 is being outputted by the first logical-product calculation unit 31, the heating can be stopped even if a signal "1" indicating starting of heating is outputted to the logical-sum calculation unit 36. Therefore, it is possible to realize the heat pump device that can minimize power consumption in a standby mode while ensuring certain reliability.

The pooling determination unit 32 detects a state where a liquid refrigerant is stayed in the compressor 1 based on the compressor temperature Tc and the external temperature To. Furthermore, the heating-amount determination unit 38 determines the amount of the liquid refrigerant retained in the compressor 1 based on the compressor temperature Tc and the external temperature To. The heating-amount determination unit 38 then calculates and outputs the voltage command value Vc required for expelling the refrigerant to outside of the compressor 1 according to the determined amount of the liquid refrigerant. Accordingly, the state where the liquid refrigerant is retained in the compressor 1 can be resolved with the minimum necessary electric power, and the influence on global warming can be reduced with the power consumption being reduced.

An operation of the inverter control unit 10 is explained next.

Figure 7:
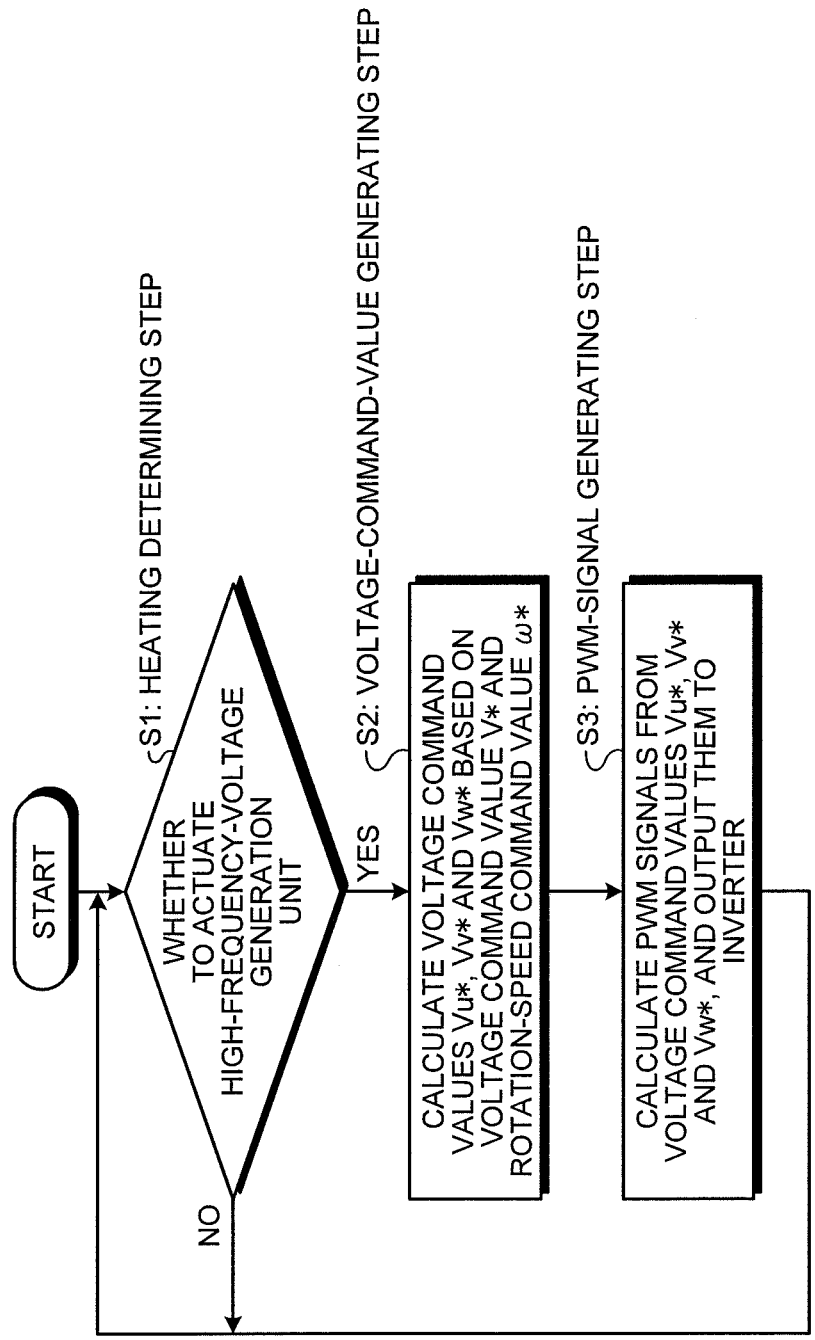
FIG. 7 is a flowchart showing an operation of the inverter control unit 10 according to the first embodiment.

FIG. 7 is a flowchart showing an operation of the inverter control unit 10 in the first embodiment.

(S1: Heating Determining Step)

The heating determination unit 12 determines whether to actuate the high-frequency-voltage generation unit 11 by the operation described above during shutdown of the compressor 1.

When the heating determination unit 12 determines that the high-frequency-voltage generation unit 11 should be actuated, that is, when the output value of the heating determination unit 12 is "1" (ON) (YES at S1), the process proceeds to S2 to generate PWM signals for preheating. On the other hand, when the heating determination unit 12 determines that the high-frequency-voltage generation unit 11 should not be actuated, that is, when the output value of the heating determination unit 12 is "0" (OFF) (NO at S1), the heating determination unit 12 determines whether to actuate the high-frequency-voltage generation unit 11 again after a predetermined time has passed.

(S2: Voltage-Command-Value Generating Step)

The selection unit 23 selects the voltage command value V* and the rotation-speed command value ω*, and the integrator 24 obtains the voltage phase θ based on the rotation-speed command value ω* selected by the selection unit 23. The voltage-command generation unit 25 calculates the voltage command values Vu*, Vv* and Vw* according to Equations (1) to (3) based on the voltage command value V* selected by the selection unit 23 and the voltage phase θ obtained by the integrator 24, and outputs the calculated voltage command values Vu*, Vv* and Vw* to the PWM-signal generation unit 26.

(S3: PWM-Signal Generating Step)

The PWM-signal generation unit 26 compares the voltage command values Vu*, Vv* and Vw* outputted by the voltage-command generation unit 25 with the carrier signal to obtain the PWM signals UP, VP, WP, UN, VN and WN, and outputs these PWM signals to the inverter 9. Accordingly, the switching elements 17a to 17f of the inverter 9 are driven to apply a high-frequency voltage to the motor 8.

By applying the high-frequency voltage to the motor 8, the motor 8 is efficiently heated by iron loss of the motor 8 and copper loss generated by the current flowing in the winding. By the motor 8 being heated, the liquid refrigerant stagnating in the compressor 1 is heated and evaporated, and leaked to outside of the compressor 1.

After a predetermined time has passed, the heating determination unit 12 returns to S1 again, and determines whether further heating is required.

As described above, in the heat pump device 100 according to the first embodiment, when the liquid refrigerant is stagnating in the compressor 1, the high-frequency voltage is applied to the motor 8, so that the motor 8 can be efficiently heated while restraining noise. Accordingly, the refrigerant retained in the compressor 1 can be efficiently heated, and the retained refrigerant can be leaked to outside of the compressor 1.

When the high-frequency voltage having a frequency equal to or higher than an operation frequency at the time of a compression operation is applied to the motor 8, a rotor in the motor 8 can not follow the frequency, and any rotations or vibrations are not generated. Therefore, at S2, the selection unit 23 had better output a rotation-speed command value ω* equal to or higher than the operation frequency at the time of the compression operation.

Generally, the operation frequency at the time of the compression operation is 1 kHz at most. Therefore, a high frequency voltage having a frequency equal to or larger than 1 kHz only has to be applied to the motor 8. When a high frequency voltage having a frequency equal to or higher than 14 kHz is applied to the motor 8, vibration sound of an iron core of the motor 8 approaches nearly an upper limit of an audible frequency, so that there is an effect for reducing noise. To this end, for example, the selection unit 23 outputs the rotation-speed command value ω* for leading to a high frequency voltage of about 20 kHz.

However, when the frequency of the high frequency voltage exceeds the maximum rated frequency of the switching elements 17a to 17f, a load or power supply short-circuit may occur due to breakage of the switching elements 17a to 17f, and it can lead to generation of smoke or fire. For this reason, it is desired to set the frequency of the high-frequency voltage to be equal to or lower than the maximum rated frequency in order to ensure reliability.

Furthermore, to achieve a high efficiency, a motor having an IPM (Interior Permanent Magnet) structure or a concentrated winding motor having a small coil end and a low winding resistance has been widely used for the recent compressor motor for a heat pump device. The concentrated winding motor has a small winding resistance and a small amount of heat generation due to copper loss, and thus a large amount of current needs to be caused to flow to the winding. If a large amount of current is caused to flow to the winding, then the current flowing to the inverter 9 also increases, thereby increasing inverter loss.

Therefore, if heating by applying the high-frequency voltage described above is performed, then an inductance component by the high frequency increases, thereby increasing winding impedance. Accordingly, although the current flowing to the winding decreases and the copper loss is reduced, iron loss due to the application of the high-frequency voltage occurs corresponding to the amount of copper loss, thereby enabling to perform efficient heating. Furthermore, because the current flowing to the winding decreases, the current flowing to the inverter also decreases, thereby enabling to reduce the loss of the inverter 9 and perform more efficient heating.

If heating by applying the high-frequency voltage described above is performed, when the compressor is based on a motor having the IPM structure, a rotor surface where high-frequency magnetic fluxes interlink with each other also becomes a heat generating portion. Therefore, increase in an area contacting the refrigerant and prompt heating of the compression mechanism can be realized, thereby enabling to perform efficient heating of the refrigerant.

At present, generally, the mainstream trend is to use silicon (Si) as a material of a semiconductor for the switching elements 17a to 17f that constitute the inverter 9 and the reflux diodes 18a to 18f that are connected to the respective switching elements 17a to 17f in parallel. However, instead of this type of semiconductor, a wide bandgap semiconductor whose material is silicon carbide (SiC), gallium nitride (GaN) or diamond may be used.

Switching elements and diode elements made from such a wide bandgap semiconductor have a high voltage resistance and a high allowable current density. Therefore, downsizing of the switching elements and diode elements is possible, and by using these downsized switching elements and diode elements, downsizing of a semiconductor module having these elements incorporated therein can be realized.

The switching elements and the diode elements made from such a wide bandgap semiconductor have a high heat resistance. Accordingly, downsizing of a radiator fin of a heat sink and air cooling of a water cooling part can be realized, thereby enabling further downsizing of the semiconductor module.

Furthermore, the switching elements and the diode elements made from such a wide bandgap semiconductor have low power loss. Therefore, the switching elements and the diode elements can be made to have a high efficiency, thereby enabling to make the semiconductor module highly efficient.

While it is desired that both the switching elements and the diode elements are made from a wide bandgap semiconductor, it is also sufficient that either the switching or diode elements are made from a wide bandgap semiconductor, and even in this case, effects described in the present embodiment can be achieved.

Besides, identical effects can be produced by using a MOSFET (Metal-Oxide-Semiconductor Field-Effect Transistor) having a super junction structure that is known as a highly efficient switching element.

In a compressor having a scroll mechanism, high-pressure relief of a compression chamber is difficult. Therefore, there is a high possibility of causing breakage of the compression mechanism due to an excessive stress applied to the compression mechanism in a case of liquid compression, as compared to a compressor of other systems. However, in the heat pump device 100 according to the first embodiment, efficient heating of the compressor 1 is possible, and stagnation of a liquid refrigerant in the compressor 1 can be suppressed. Accordingly, liquid compression can be prevented, the heat pump device 100 is beneficial even when a scroll compressor is used as the compressor 1.

Furthermore, in the case of a heating device having a frequency of 10 kHz and an output exceeding 50 W, the heating device may be subjected to the restriction of laws and regulations. For this reason, it may as well be admitted that an amplitude of the voltage command value is adjusted so as not to exceed 50 W in advance, and/or feedback control is executed with detecting the flowing current and the voltage so as to be 50 W or less.

The inverter control unit 10 is configured by a CPU (Central Processing Unit), a DSP (Digital Signal Processor), a microcomputer, an electronic circuit or the like.

Second Embodiment

In a second embodiment, a method of generating a high frequency voltage is described.

In a case of a general inverter, a carrier frequency, that is a frequency of a carrier signal, has an upper limit that is determined by a switching speed of switching elements of the inverter. Therefore, it is difficult to output a high frequency voltage having a frequency equal to or higher than the carrier frequency. In a case of a general IGBT (Insulated Gate Bipolar Transistor), the upper limit of the switching speed is about 20 kHz.

When the frequency of the high frequency voltage becomes about 1/10 of the carrier frequency, an adverse effect may occur such that the waveform output accuracy of the high frequency voltage deteriorates and DC components are superposed on the high frequency voltage. When the carrier frequency is set to 20 kHz in view of the above, if the frequency of the high frequency voltage is set equal to or lower than 2 kHz that is 1/10 of the carrier frequency, then the frequency of the high frequency voltage is in an audible frequency domain, and so it is a concern that noise is increased.

Figure 8:
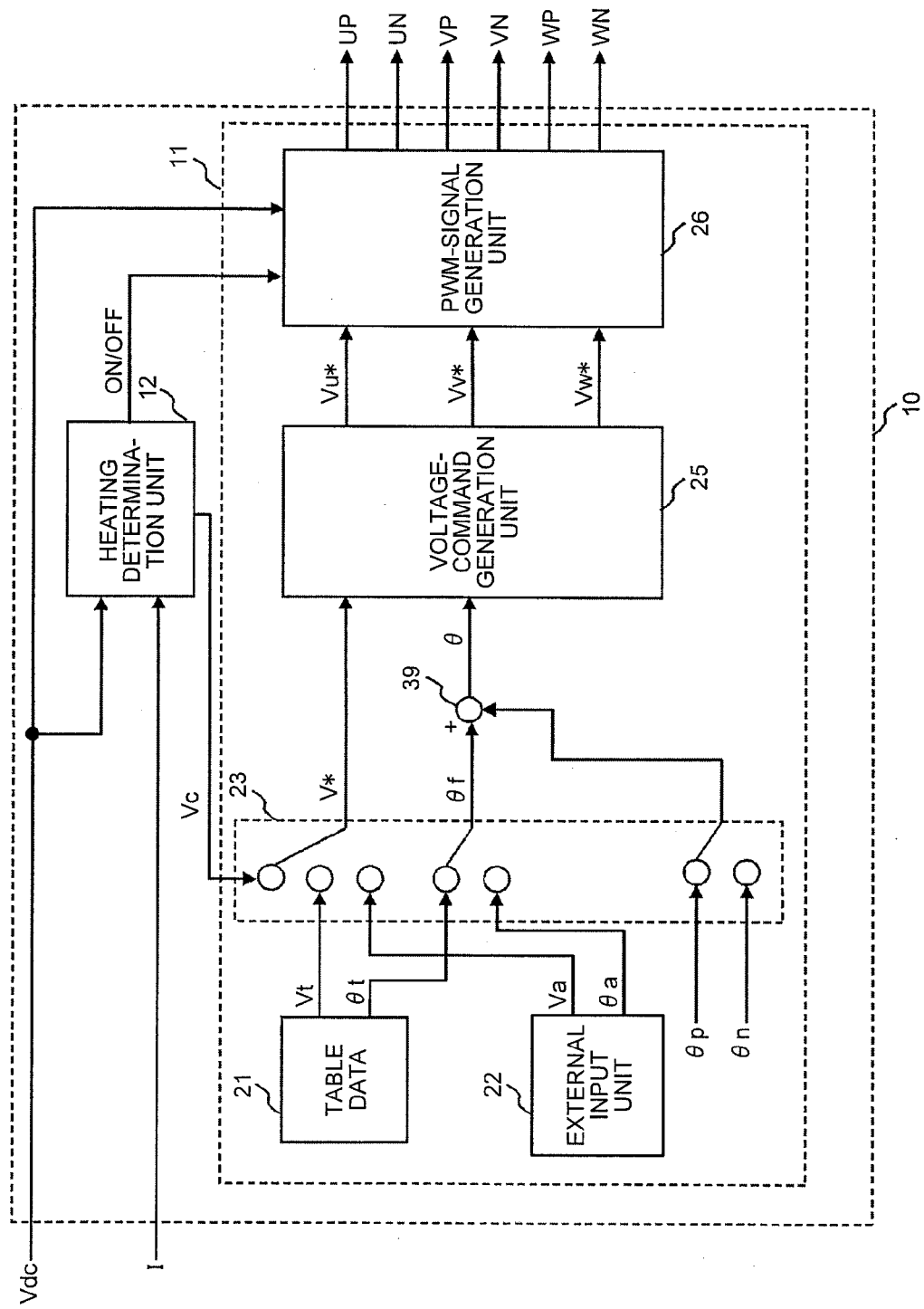
FIG. 8 is a diagram showing a configuration of the heat pump device 100 according to a second embodiment.

FIG. 8 is a diagram showing a configuration of the heat pump device 100 according to the second embodiment.

The heat pump device 100 according to the second embodiment is the same as the heat pump device 100 according to the first embodiment shown in FIG. 1, except for including an addition unit 39 that adds the phase θp or the phase θn switched by the selection unit 23 to a reference phase θf to make the voltage phase θ, instead of the integrator 24 (see FIG. 3). Therefore, constituent elements identical to those of the first embodiment are denoted by the same reference signs and explanations thereof will be omitted, and only different points are explained.

In the first embodiment, the rotation-speed command value ω* is integrated by the integrator 24 to obtain the voltage phase θ. On the other hand, in the second embodiment, the selection unit 23 (phase switching unit) alternately switches between two types of voltage phases, the phase θp and the phase θn that is different from the phase θp substantially by 180 degrees. The addition unit 39 then adds the phase θp or θn selected by the selection unit 23 to the reference phase θf and designates the obtained phase as the voltage phase θ.

In the explanations below, it is assumed that θp=0 [degree], and θn=180 [degrees].

An operation of the inverter control unit 10 is explained next.

Except for the operation of S2 shown in FIG. 7, operations of the inverter control unit 10 are the same as those of the inverter control unit 10 according to the first embodiment. Therefore, explanations thereof will be omitted.

At S2, the selection unit 23 switches between the phases θp and θn alternately at the timing of either a top (peak) or bottom (valley) of a carrier signal or at the timings of the top and bottom of the carrier signal. The addition unit 39 adds the phase θp or phase θn selected by the selection unit 23 to the reference phase θf, designates the obtained phase as the voltage phase θ, and outputs the voltage phase θ to the voltage-command generation unit 25. The voltage-command generation unit 25 obtains the voltage command values Vu*, Vv* and Vw* according to Equations (1) to (3) using the voltage phase θ and the voltage command value V*, and outputs the voltage command values Vu*, Vv* and Vw* to the PWM-signal generation unit 26.

Because the selection unit 23 switches between the phases θp and θn at the timing of the top or bottom, or at the timings of the top and bottom of the carrier signal, the PWM signal synchronized with the carrier signal can be outputted.

Figure 9:
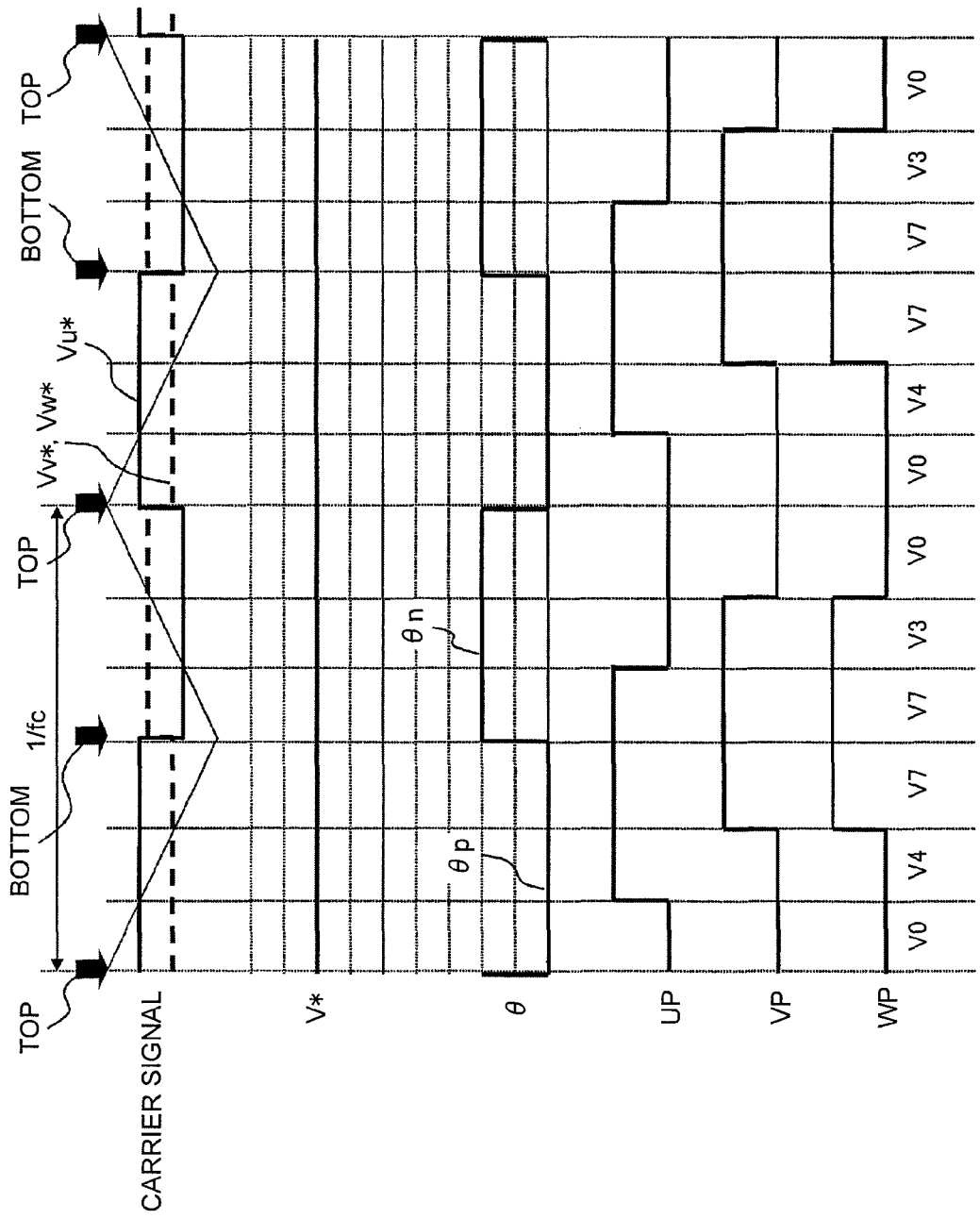
FIG. 9 is a timing chart when a phase θp and a phase θn are alternately switched by a selection unit 23 at a timing of a top and a bottom of a carrier signal.

FIG. 9 is a timing chart when the phase θp and the phase θn are alternately switched by the selection unit 23 at timings of a top and a bottom of a carrier signal. Because the UP, VP and WP are opposite in ON/OFF state to UN, VN and WN, respectively and when the state of one signal is ascertained, the other one can be ascertained, only UP, VP and WP are described here. It is assumed here that θf=0 [degree].

In this case, a PWM signal changes as shown in FIG. 9. The voltage vector changes in order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 10:
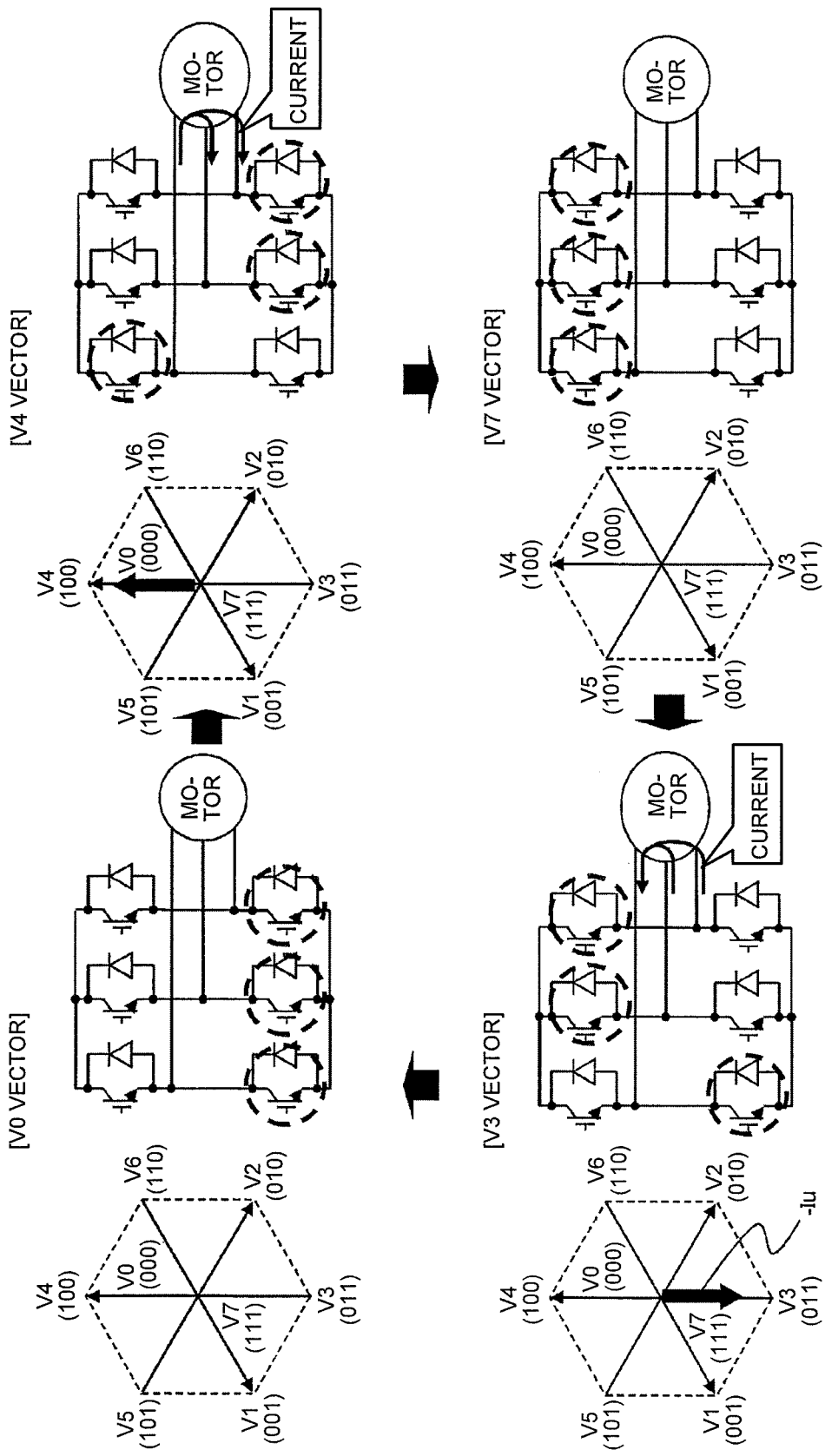
FIG. 10 is an explanatory diagram of changes of a voltage vector shown in FIG. 9.

FIG. 10 is an explanatory diagram of a change of the voltage vector shown in FIG. 9. In FIG. 10, it is indicated that the switching element 17 surrounded by a broken line is ON, and the switching element 17 not surrounded by a broken line is OFF.

As shown in FIG. 10, at the time of applying the V0 vector and the V7 vector, lines of the motor 8 are short-circuited, and any voltage is not outputted. In this case, the energy accumulated in the inductance of the motor 8 becomes a current, and the current flows in the short circuit. At the time of applying the V4 vector, a current (current of +Iu current) flows in the direction of the U-phase, in which the current flows into the motor 8 via the U-phase and flows out from the motor 8 via the V-phase and the W-phase, and at the time of applying the V3 vector, a current (current of −Iu) flows to the winding of the motor 8 in the direction of the −U phase, in which the current flows into the motor 8 via the V-phase and the W-phase and flows out from the motor 8 via the U-phase. That is, the current flows to the winding of the motor 8 at the time of applying the V4 vector in the opposite direction to that at the time of applying the V3 vector and vice versa. Because the voltage vector changes in order of V0, V4, V7, V3, V0, and so on, the current of +Iu and the current of −Iu flow to the winding of the motor 8 alternately. Particularly, as shown in FIG. 5, because the V4 vector and the V3 vector appear during one carrier cycle (1/fc), an AC voltage synchronized with a carrier frequency fc can be applied to the winding of the motor 8.

Because the V4 vector (the current of +Iu) and the V3 vector (the current of −Iu) are alternately output, forward and reverse torques are switched instantaneously. Therefore, because the torque is compensated, the voltage application is possible, while suppressing vibrations of the rotor.

Figure 11:
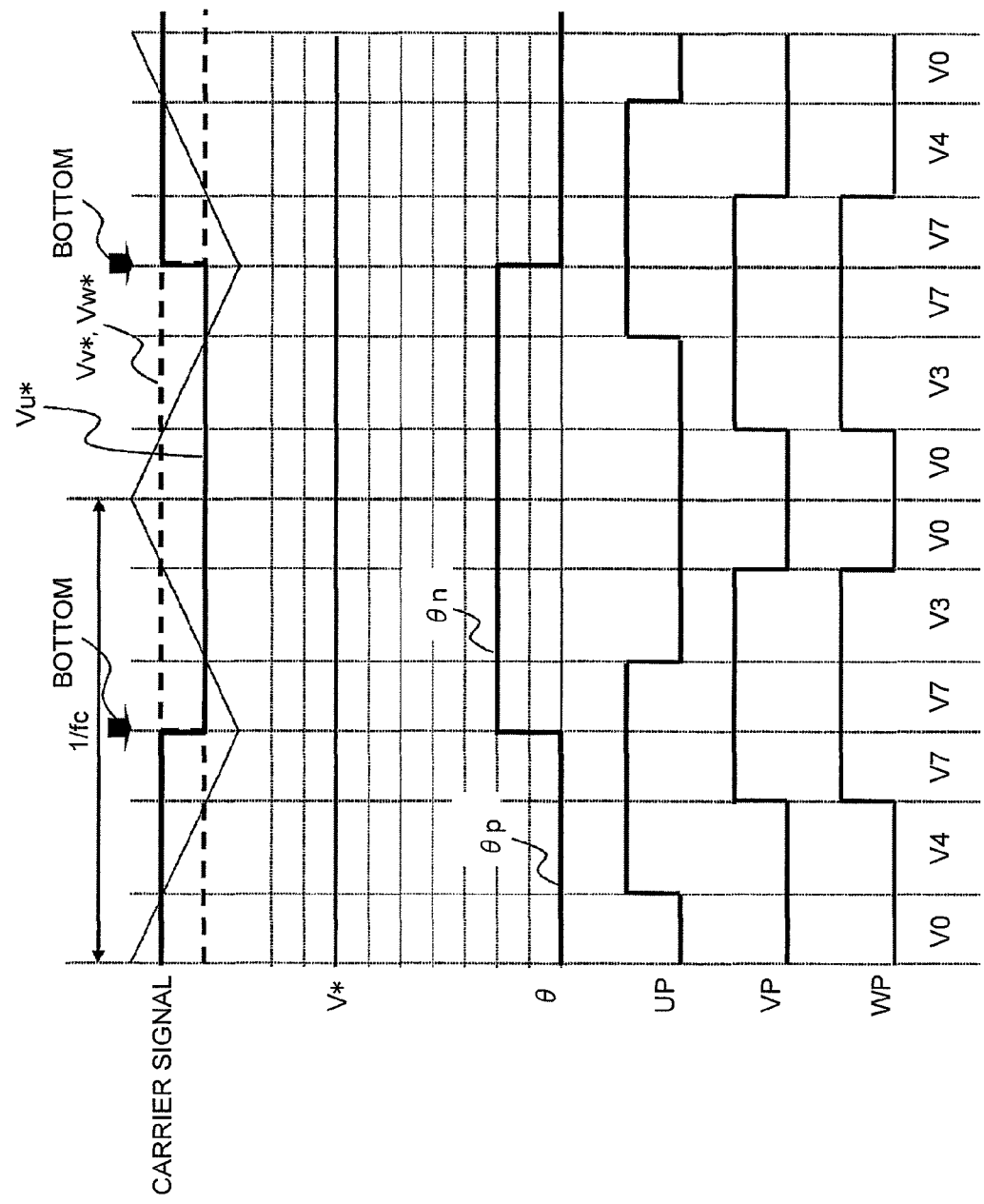
FIG. 11 is a timing chart when the phase θp and the phase θn are alternately switched by the selection unit 23 at a timing of a bottom of a carrier signal.

FIG. 11 is a timing chart when the phase θp and the phase θn are alternately switched by the selection unit 23 at a timing of a bottom of a carrier signal.

In this case, the PWM signal changes as shown in FIG. 11. The voltage vector changes to V0, V4, V7, V7, V3, V0, V0, V3, V7, V7, V4, V0, and so on in this order. Because the V4 vector and the V3 vector appear during two carrier cycles, an AC voltage having a frequency half the carrier frequency can be applied to the winding of the motor 8.

Figure 12:
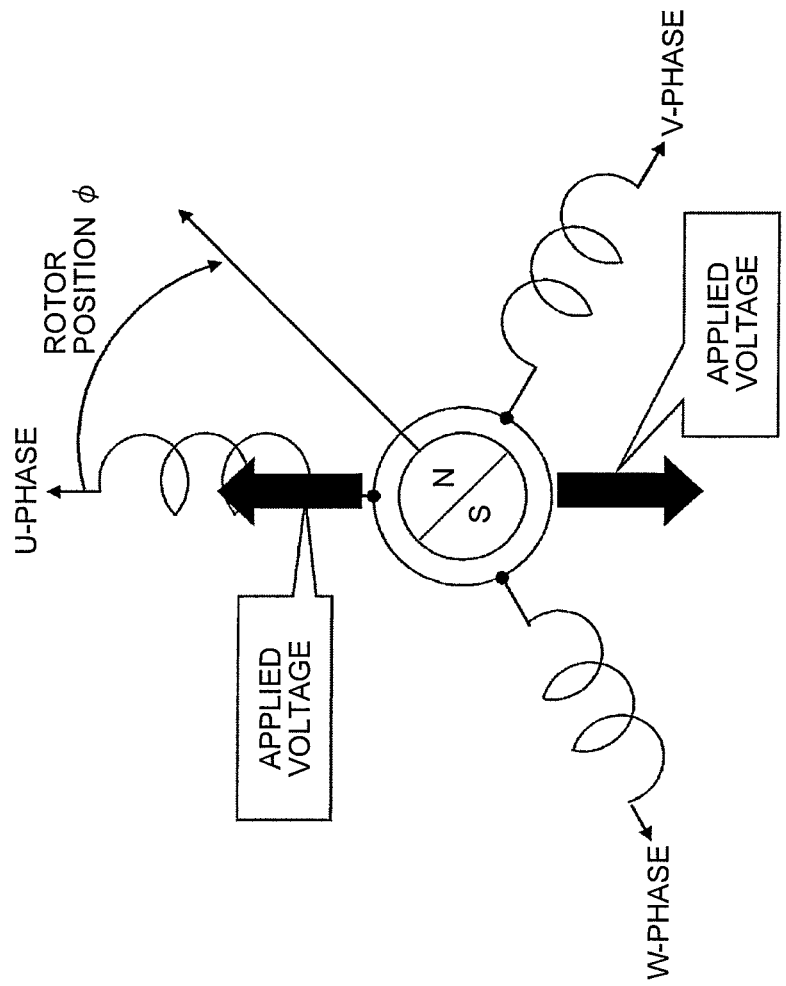
FIG. 12 is an explanatory diagram of a rotor position of an IPM motor.

FIG. 12 is an explanatory diagram of a rotor position (a stop position of the rotor) of an IPM motor. A rotor position φ of the IPM motor is expressed here by the size of an angle by which the direction of the N pole of the rotor deviates from the U-phase direction.

Figure 13:
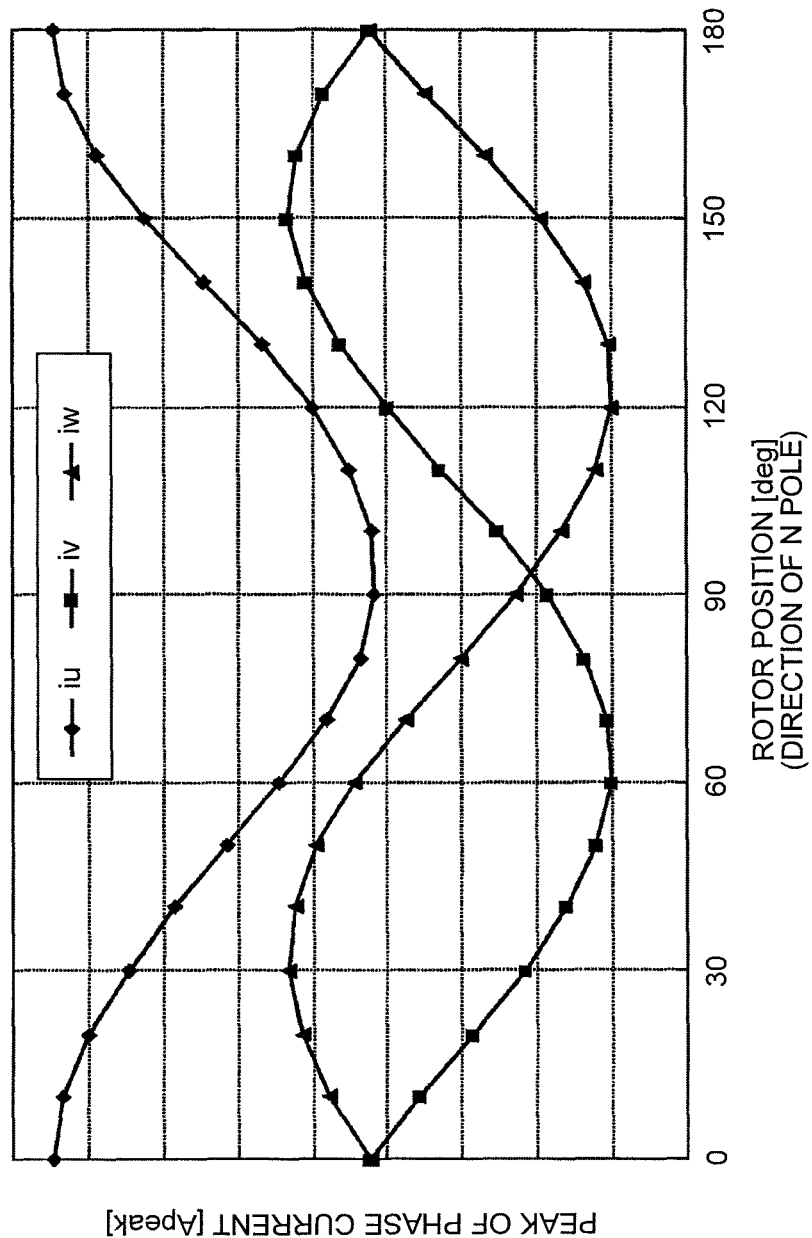
FIG. 13 is a graph showing change of a current depending on a rotor position.

FIG. 13 is a graph showing current change according to a rotor position. In the case of the IPM motor, the winding inductance depends on the rotor position. Therefore, the winding impedance expressed by a product of an electric angle frequency ω and an inductance value fluctuates according to the rotor position. Accordingly, even if the same voltage is applied, a current flowing to the winding of the motor 8 changes depending on the rotor position, and a heating amount changes. As a result, a large amount of power may be consumed to obtain the required heating amount, depending on the rotor position.

Therefore, the reference phase θf is changed with a lapse of time to apply a voltage to the rotor evenly.

Figure 14:
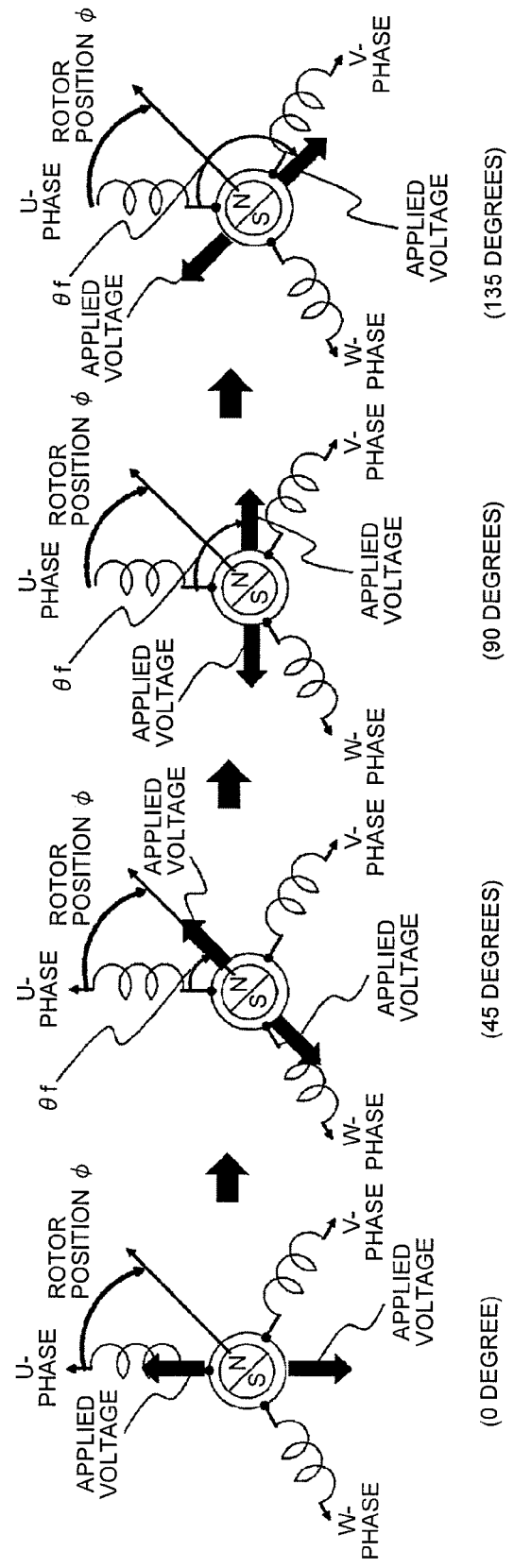
FIG. 14 is a diagram showing an applied voltage when θf is changed with a lapse of time.

FIG. 14 is an illustration showing applied voltages when the reference phase θf is changed with a lapse of time.

The reference phase θf is changed every 45 degrees with a lapse of time, at 0 degree, 45 degrees, 90 degrees, 135 degrees, and so on. When the reference phase θf is 0 degree, the phase θ of the voltage command value becomes 0 degree and 180 degrees. When the reference phase θf is 45 degrees, the phase θ of the voltage command value becomes 45 degrees and 225 degrees. When the reference phase θf is 90 degrees, the phase θ of the voltage command value becomes 90 degrees and 270 degrees. When the reference phase θf is 135 degrees, the phase θ of the voltage command value becomes 135 degrees and 315 degrees.

That is, the reference phase θf is initially set to 0 degree, and the phase θ of the voltage command value is switched between 0 degree and 180 degrees in synchronization with a carrier signal for a predetermined time. Thereafter, the reference phase θf is switched to 45 degrees, and the phase θ of the voltage command value is switched between 45 degrees and 225 degrees in synchronization with the carrier signal for the predetermined time. Subsequently, the reference phase θf is switched to 90 degrees and so on. In this manner, the phase θ of the voltage command value is switched between 0 degree and 180 degrees, 45 degrees and 225 degrees, 90 degrees and 270 degrees, 135 degrees and 315 degrees, and so on for each predetermined time.

Accordingly, because an energization phase of a high-frequency AC voltage changes with a lapse of time, the influence of inductance characteristics according to a rotor stop position can be eliminated, and the compressor 1 can be heated uniformly, regardless of the rotor position.

Figure 15:
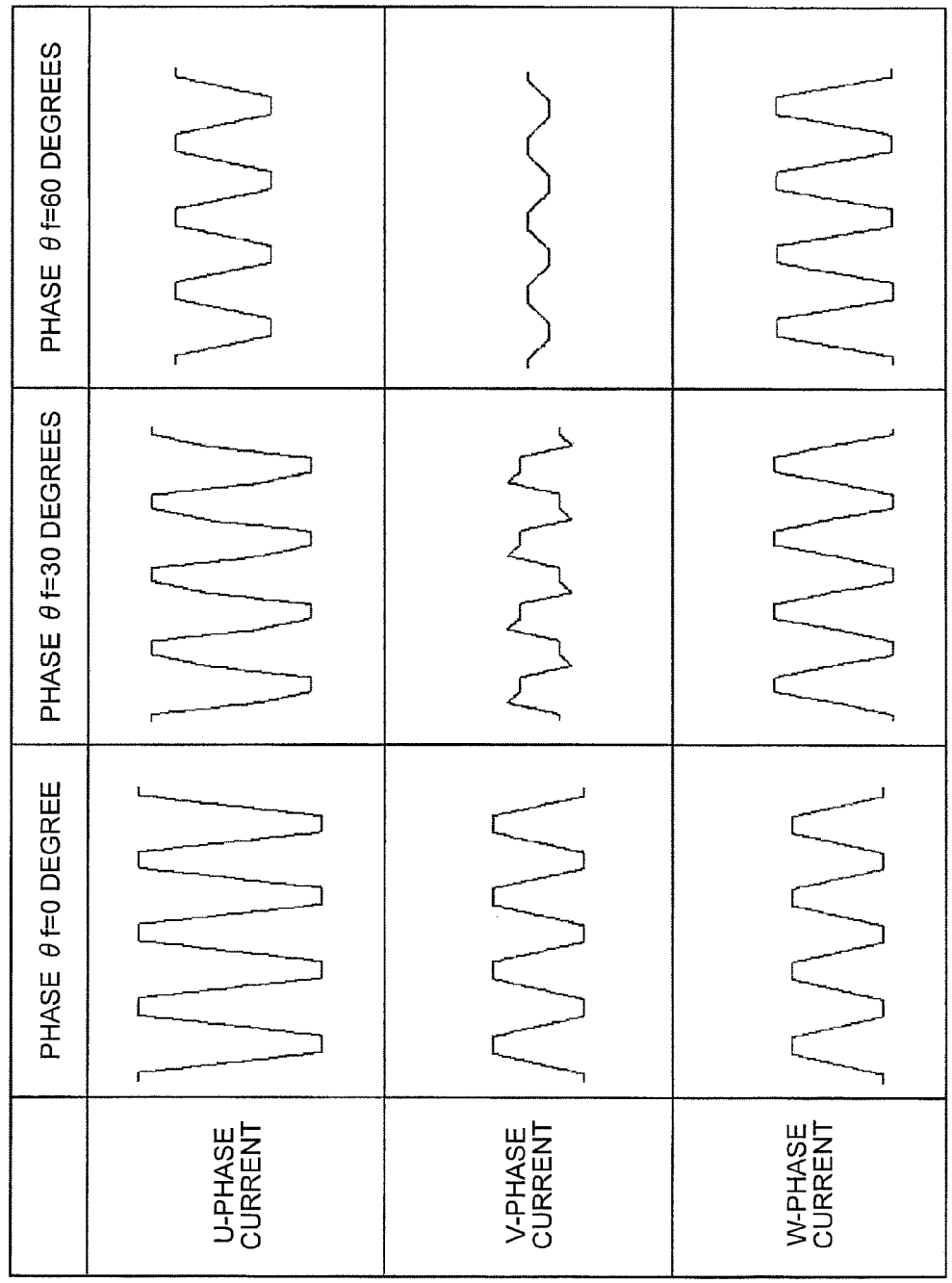
FIG. 15 is a diagram showing currents flowing to respective U-, V- and W-phases of a motor 8 when θf is 0 degree (0 degree in a U-phase (V4) direction), 30 degrees, and 60 degrees.

FIG. 15 is a chart representing currents flowing to the respective U-, V- and W-phases of the motor 8 when the reference phase θf is 0 degree (0 degree in the U-phase (V4) direction), 30 degrees, and 60 degrees.

When the reference phase θf is 0 degree, as shown in FIG. 9, only one other voltage vector (voltage vector in which, of the switching elements 17*a* to 17*f*, one switching element on the positive voltage side and two switching elements on the negative voltage side, or two switching elements on the positive voltage side and one switching element on the negative voltage side become an ON state) is generated between V0 and V7. In this case, the current waveform becomes a trapezoidal shape and becomes a current having less harmonic components.

However, when the reference phase θf is 30 degrees, two different voltage vectors are generated between V0 and V7. In this case, the current waveform is distorted, and the current has plenty of harmonic components. The distortion of the current waveform may cause adverse effects including motor noise, motor shaft vibrations, and the like.

When the reference phase θf is 60 degrees, only one other voltage vector is generated between V0 and V7, as in the case of the reference phase θf being 0 degree. In this case, the current waveform becomes a trapezoidal shape and the current has less harmonic components.

In this manner, when the reference phase θf is n times (n is an integer equal to or larger than 0) of 60 degrees, because the voltage phase θ becomes a multiple of 60 degrees (here, θp=0 [degree], θn=180 [degrees]), only one other voltage vector is generated between V0 and V7. Meanwhile, when the reference phase θf is other than n times of 60 degrees, because the voltage phase θ does not become a multiple of 60 degrees, two other voltage vectors are generated between V0 and V7. If two other voltage vectors are generated between V0 and V7, the current waveform is distorted, and the current has plenty of harmonic components, thereby leading to possibility of causing adverse effects including motor noise, motor shaft vibrations, and the like. Therefore, it is desired to change the reference phase θf at 60-degree intervals of 0 degree, 60 degrees, and so on.

Figure 16:
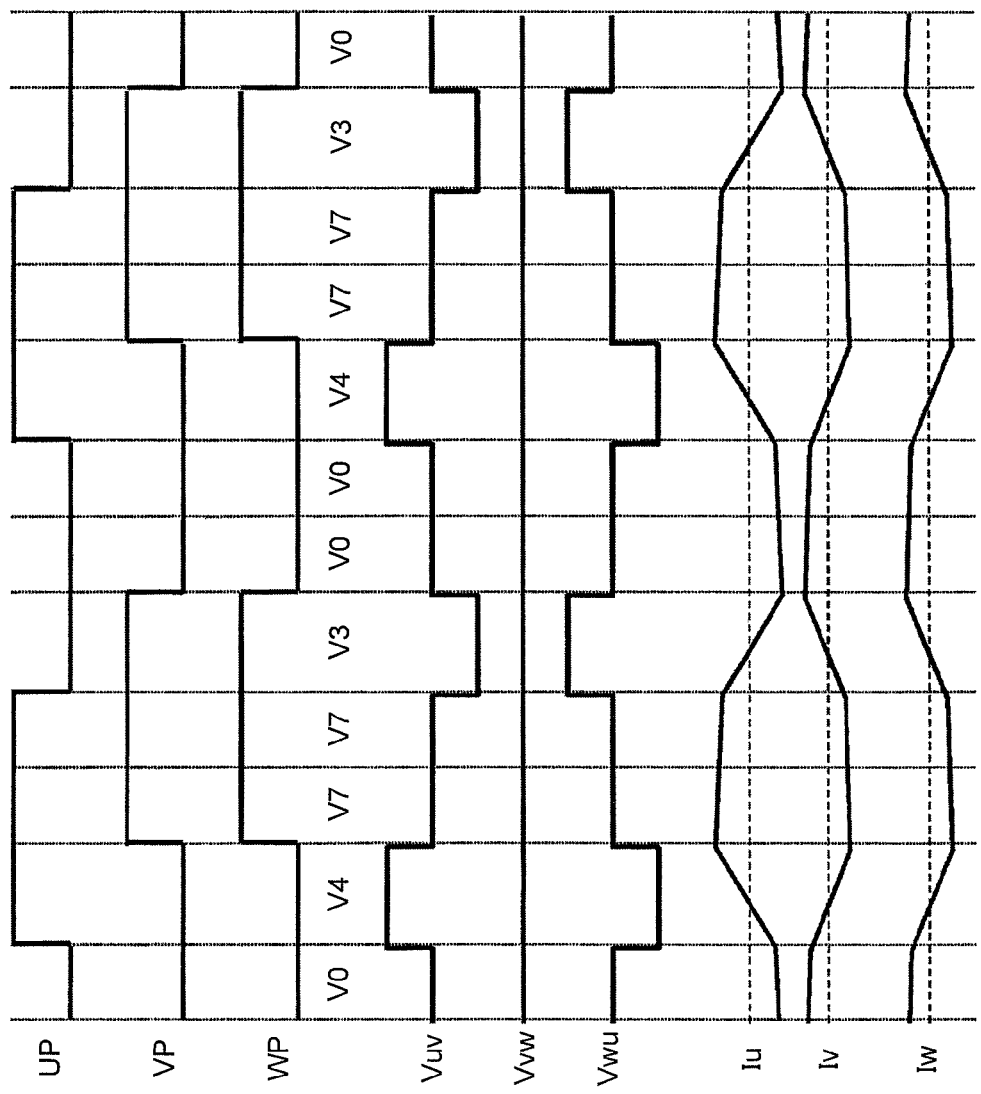
FIG. 16 is a chart showing line voltages and phase currents when switching elements 17a to 17f of the inverter 9 are driven by PWM signals UP, VP and WP (UN, VN and WN are respectively opposite of UP, VP and WP) shown in FIG. 9, respectively.

FIG. 16 is a chart showing line voltages and phase currents when the switching elements 17*a* to 17*f* of the inverter 9 are driven by the PWM signals UP, VP and WP (UN, VN and WN are inversions of UP, VP and WP, respectively) shown in FIG. 9.

The switching elements 17*a* to 17*f* of the inverter 9 are driven by the PWM signals UP, VP and WP (UN, VN and WN are inversions of UP, VP and WP, respectively) shown in FIG. 9. Next, as shown in FIG. 16, line voltages Vuv, Vvw and Vwu are outputted during the V4 and V3 vectors being outputted, and the polarity of phase currents Iu, Iv and Iw changes as shown in FIG. 16. Furthermore, in zero vectors V0 and V7, the phase currents Iu, Iv and Iw attenuate due to the resistance and the inductance of the motor 8. Accordingly, a high-frequency AC voltage is applied to the motor 8.

Figure 17:
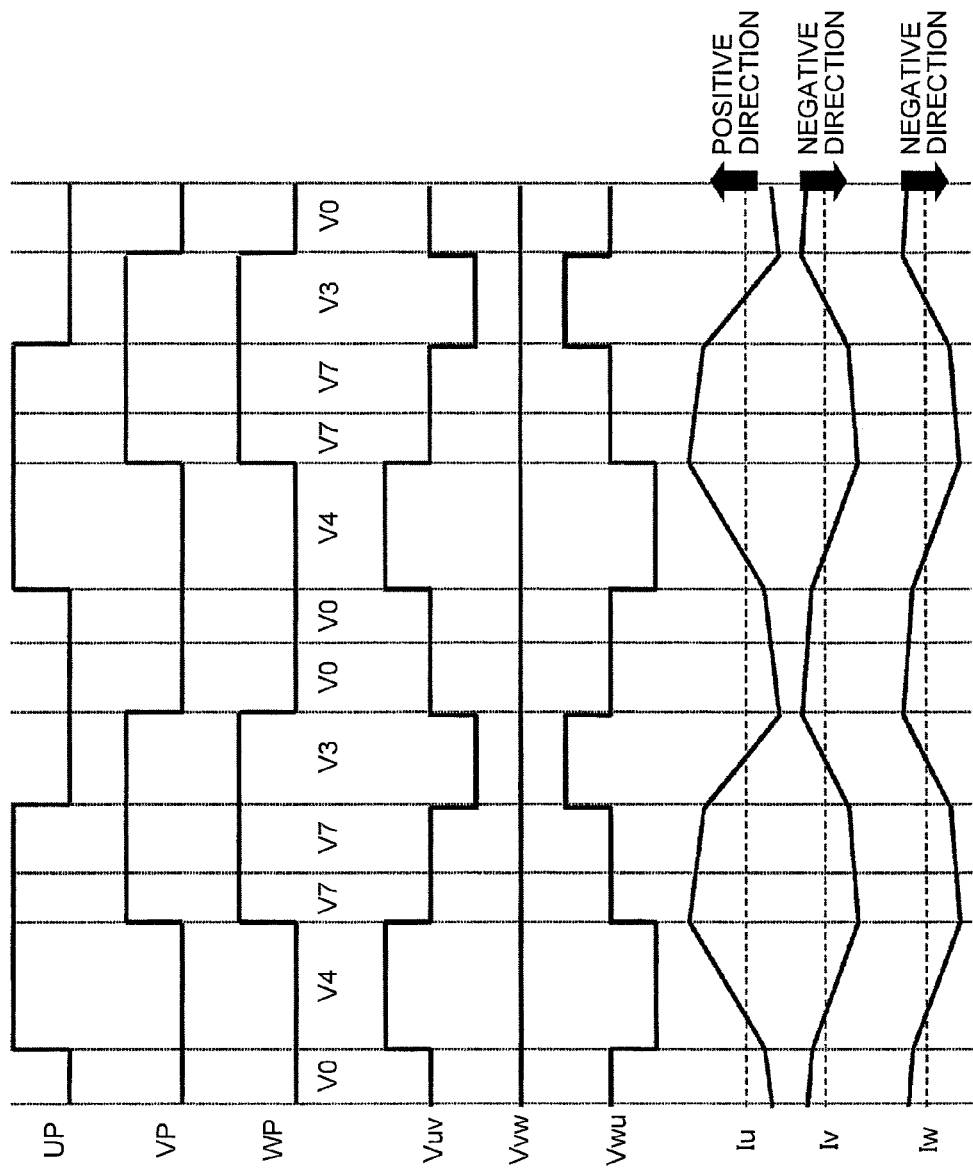
FIG. 17 is a chart showing line voltages and phase currents when V4 is longer than V3.

However, the generation times of V4 and V3 may be different in length from each other due to an error in computing or the like. For example, when V4 is longer than V3, the U-phase current Iu has an offset in a positive direction as shown in FIG. 17, and the V-phase current Iv and the W-phase current Iw have offsets in a negative direction. As a result, DC components are superposed on the current, and vibrations are generated because the rotor of the motor 8 is pulled due to DC excitation caused by the DC components.

Figure 18:
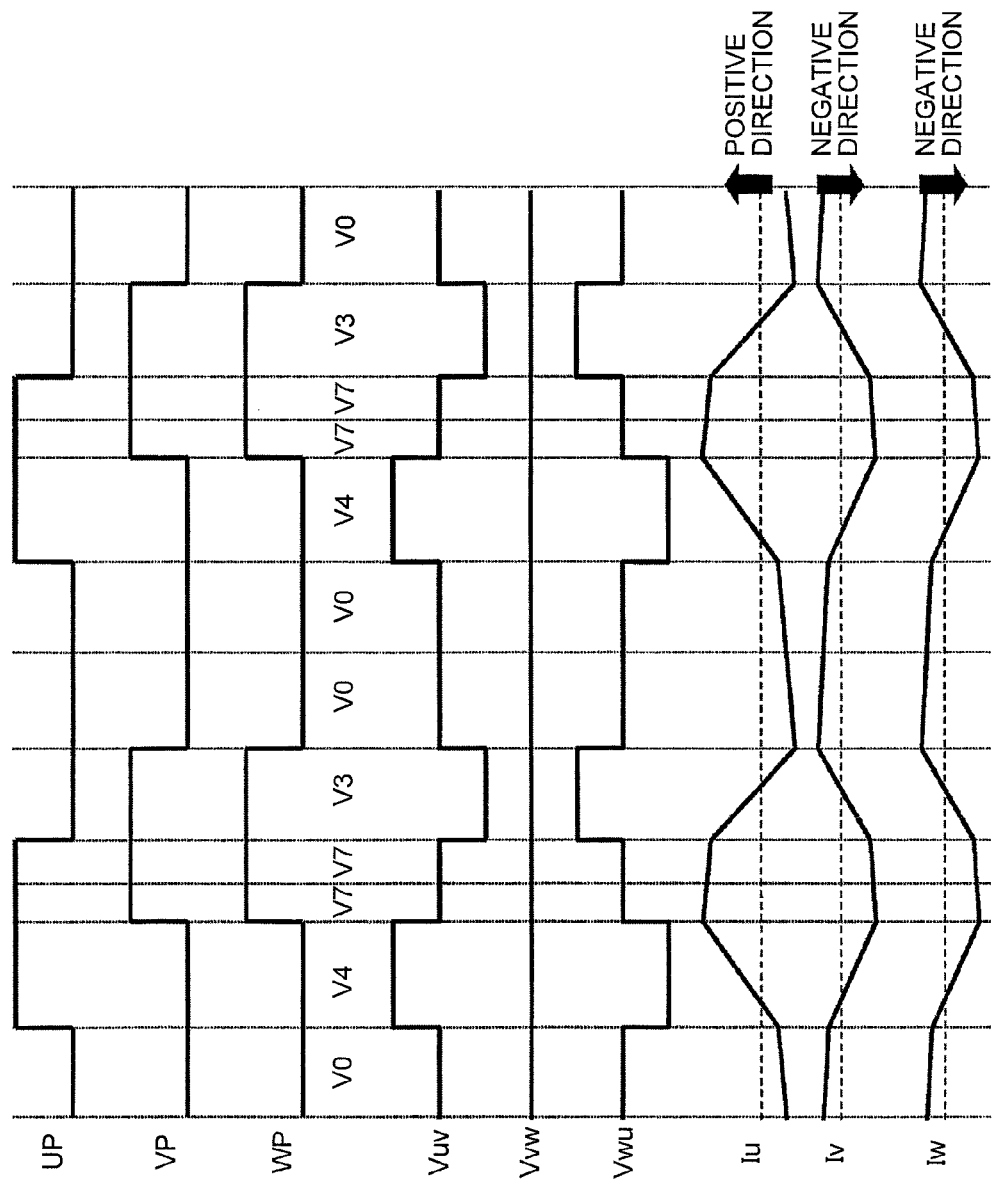
FIG. 18 is a chart showing line voltages and phase currents when V0 is longer than V7.

Furthermore, not only V4 and V3, the generation times of the zero vectors V0 and V7 may be different in length from each other. Because the time during which the current attenuates changes according to a time constant determined by the resistance and the inductance of the motor 8 in a zero vector period, for example, when V0 is longer than V7, the U-phase current Iu has an offset in the positive direction, and the V-phase current Iv and the W-phase current Iw have offsets in the negative direction as shown in FIG. 18. As a result, DC components are superposed on the current, and vibrations are generated because the rotor of the motor 8 is pulled due to DC excitation.

Now the following case is discussed in which the high-frequency voltage is applied by switching the voltage phases θp=0 degree and θn=180 degrees at the top and bottom of a carrier signal. In this case, as shown in FIG. 9, real vectors V4 and V3, and zero vectors V0 and V7 are generated in one carrier cycle (1/fc). The current offset is caused by a difference in length between times during which the real vectors V4 and V3 are generated or a difference in the length of a time during which the zero vectors V0 and V7 are generated in one carrier cycle as described above.

Therefore, for example, when the high-frequency voltage is generated with switching the voltage phases θp=0 degree and θn=180 degrees at the top and bottom of the carrier signal, in order to cancel the current offsets, the lengths of V4 and V3, and the lengths of the zero vectors V0 and V7 in one carrier cycle should be matched with each other, respectively.

Figure 19:
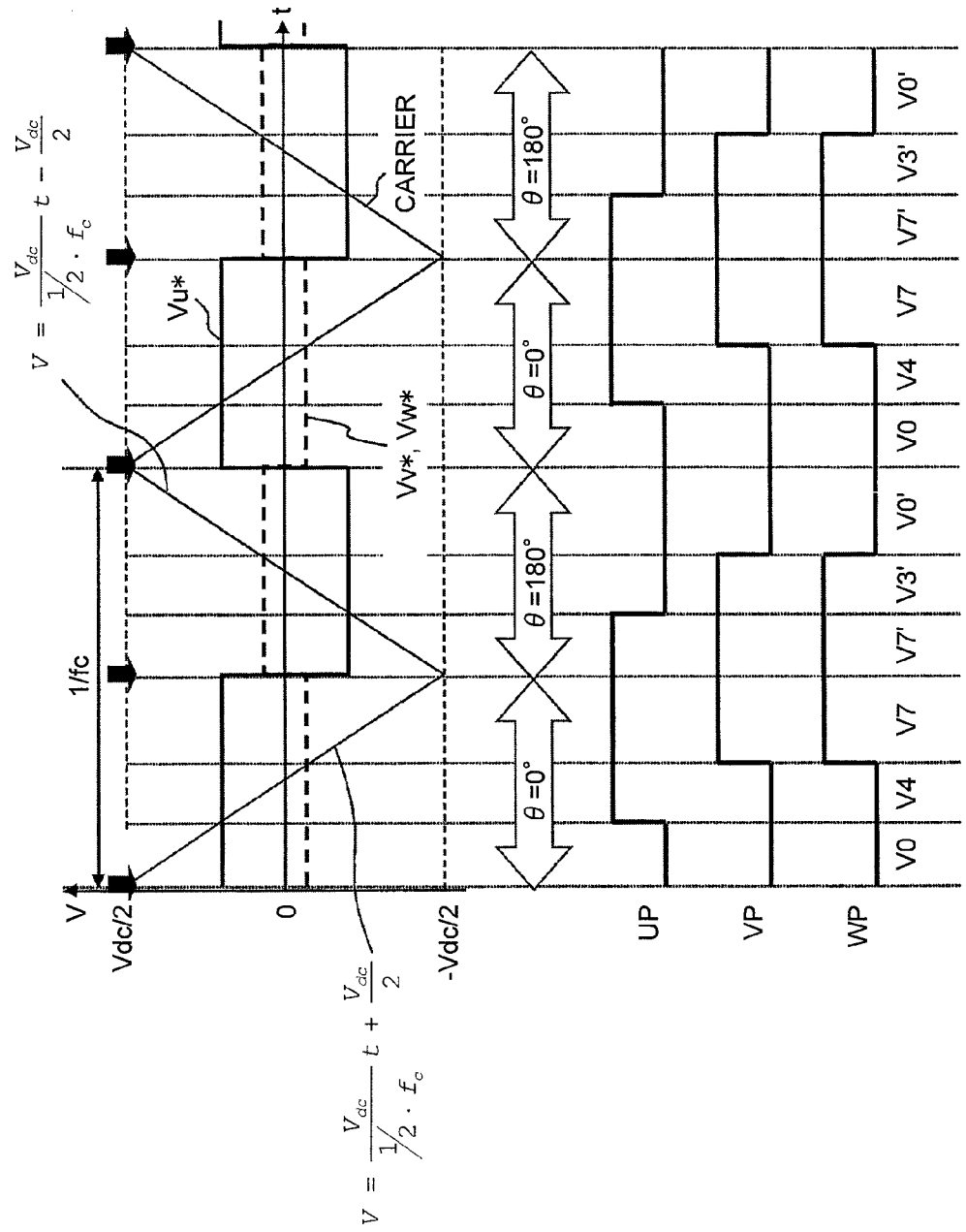
FIG. 19 is an explanatory chart of a voltage V of a carrier signal.

FIG. 19 is an explanatory chart of a voltage V of a carrier signal.

As shown in FIG. 19, the voltage V of the carrier signal in a period of θ=0 degree, that is, in a period in which the carrier signal proceeds from the top to the bottom is expressed by the following Equation (4), where Vdc represents the bus voltage, fc represents the carrier frequency, and t represents time.

$$V = -\frac{V_{dc}}{\frac{1}{2} \cdot f_c} t + \frac{V_{dc}}{2} \quad (4)$$

If Equation (4) is solved with respect to the time t, the following Equation (5) is obtained.

$$t = \frac{1}{2 \cdot fc}\left(\frac{1}{2} - \frac{V}{Vdc}\right) \quad (5)$$

Here, t obtained with V=Vu* becomes the length of V0, and t obtained with V=Vv* (or Vw*) becomes the length of V0+V4. Therefore, if it is considered that t in Equation (5) is a function of the voltage V, then the length of V0=t(Vu*), the length of V4=t(Vv*)−t(Vu*), and the length of V7=1/(2·fc)−t(Vv*).

Subsequently, as shown in FIG. 19, the voltage V of the carrier signal in a period of θ=180 degrees, that is, in a period in which the carrier signal proceeds from the bottom to the top is expressed by the following Equation (6), where the bus voltage is represented by Vdc, the carrier frequency is represented by fc, and the time is represented by t.

$$V = \frac{V_{dc}}{\frac{1}{2} \cdot f_c} t - \frac{V_{dc}}{2} \quad (6)$$

If Equation (6) is solved with respect to the time t, the following Equation (7) is obtained.

$$t = \frac{1}{2 \cdot f_c}\left(\frac{1}{2} + \frac{V}{V_{dc}}\right) \quad (7)$$

Here, t obtained with V=Vu* becomes the length of V7' ("'" is added in order to discriminate from the period from the top to the bottom), and t obtained with V=Vv* (or Vw*) becomes the length of V7'+V3'. Therefore, if it is considered that t in Equation (7) is a function of the voltage V, then the length of V7'=t(Vu*), the length of V3'=t(Vv*)−t(Vu*), and the length of V0'=1/(2·fc)−t(Vv*).

Therefore, in the case of considering one carrier cycle, if the voltage command values Vu*, Vv* and Vw* are corrected so that V4 and V3, which are the real vectors, are matched with each other, and the sum of V0 and V0' and the sum of V7 and V7' match with each other, occurrence of the current offset can be suppressed. Shaft vibrations of the motor 8 can be also suppressed.

Figure 20:
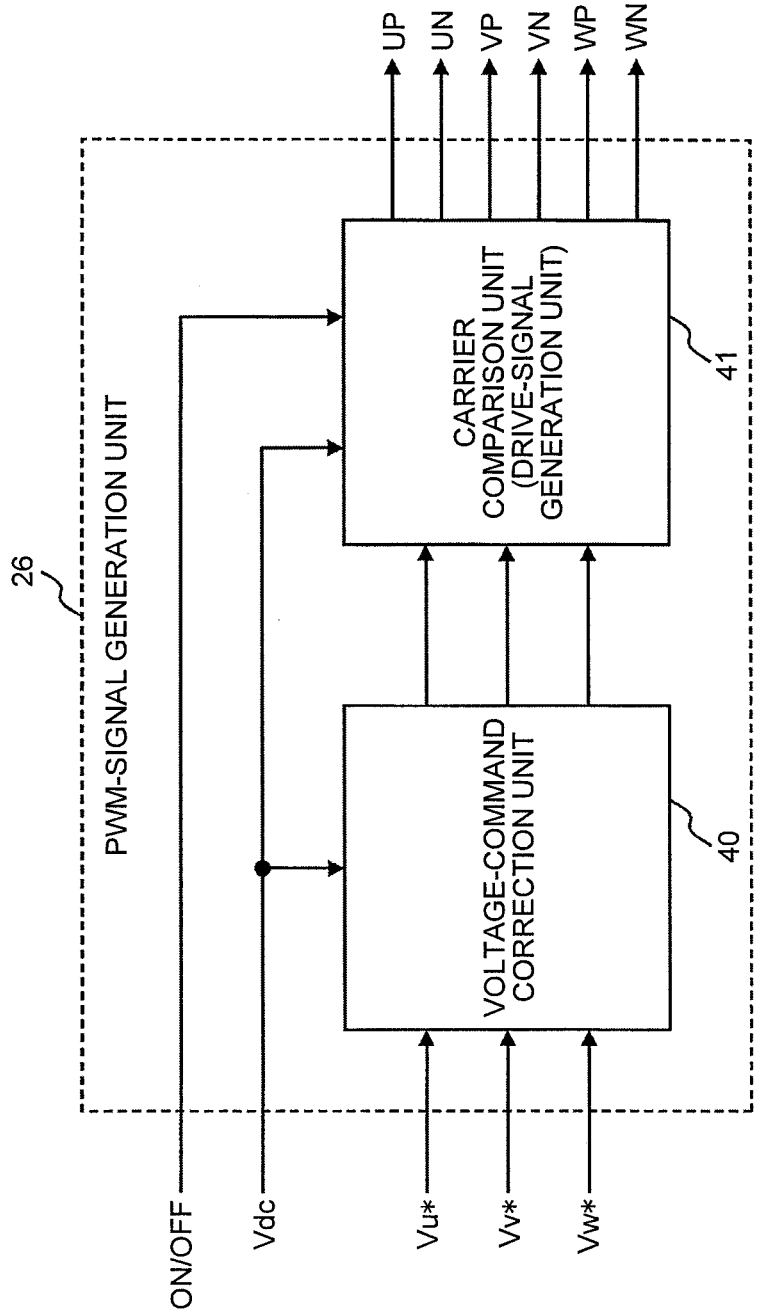
FIG. 20 is a diagram showing a configuration of a PWM-signal generation unit 26 according to the second embodiment.

FIG. 20 is an diagram showing a configuration of the PWM-signal generation unit 26 according to the second embodiment.

The PWM-signal generation unit 26 according to the second embodiment includes a voltage-command correction unit 40 and a carrier comparison unit 41 (drive-signal generation unit).

The voltage-command correction unit 40 receives Vu*, Vv* and Vw* outputted by the voltage-command generation unit 25, and obtains the real vectors and the zero vectors using Equation (5) in the period from a top to a bottom of a carrier signal, where the length of V0=t(Vu*), the length of V4=t(Vv*)−t(Vu*), and the length of V7=1/(2·fc)−t(Vv*). Furthermore, the voltage-command correction unit 40 obtains the real vectors and the zero vectors using Equation (7) in the period from the bottom to the top, with the length of V7'=t(Vu*), the length of V3'=t(Vv*)−t(Vu*), and the length of V0'=1/(2·fc)−t(Vv*).

The voltage-command correction unit 40 performs correction of the real vectors required for applying the voltage for "length of V4=length of V3" to be true with one having a lower value being matched with the other having a higher value. Accordingly, decrease in the heating amount can be suppressed and the offset of currents can be suppressed. The voltage-command correction unit 40 further adjusts the amount of zero vectors for "length of V0+length of V0'=length of V7+length of V7'" and "length of V0+length of V4+length of V7=length of V0'+length of V3'+length of V7'"=1/(2·fc) to be true.

Then, the voltage-command correction unit 40 calculates the voltage command values Vu*', Vv*', and Vw*' according to Equation (4) using the obtained length of V0, length of V4, and length of V7. For example, when the length of V0 is inputted to t in Equation (4) to perform computing, the voltage command value Vu* can be obtained. Alternatively, the voltage-command correction unit 40 calculates the voltage command values Vu*', Vv*' and Vw*' according to Equation (6) using the length of V0', the length of V3, and the length of V7'. For example, when the length of V7' is inputted to t in Equation (6) to perform computing, the voltage command value Vu* can be obtained. Accordingly, the voltage command values Vu*', Vv*' and Vw*' that can cancel the current offset can be obtained.

The carrier comparison unit 41 compares the voltage command values Vu*', Vv*' and Vw*' obtained by the voltage-command correction unit 40 with the carrier signal, and generates and outputs the PWM signals UP, VP, WP, UN, VN and WN. The switching elements 17a to 17f are driven by the PWM signals UP, VP, WP, UN, VN and WN. Accordingly, a current in which the current offset is cancelled can be caused to flow to the motor 8, and shaft vibrations due to DC excitation can be prevented.

As described above, in the heat pump device 100 according to the second embodiment, two types of phases of the phase θp and the phase θn that is different from the phase θp substantially by 180 degrees, are switched alternately in synchronization with the carrier signal, and are designated as the voltage phase θ. Accordingly, a high frequency voltage synchronized with the carrier signal can be applied to the winding of the motor 8.

In the heat pump device 100 according to the second embodiment, the reference phase θf is changed with a lapse of time. Therefore, the energization phase of the high-frequency AC voltage changes with a lapse of time, and thus the compressor 1 can be equally heated, regardless of the rotor position.

Furthermore, in the heat pump device 100 according to the second embodiment, Vu*, Vv* and Vw* outputted by the voltage-command generation unit 25 are corrected to generate the voltage command values Vu*', Vv*' and Vw*'. Therefore, a current in which current offset has been canceled can be caused to flow to the motor 8, and shaft vibrations due to DC excitation can be prevented.

Third Embodiment

In a third embodiment, one example of a circuit configuration of the heat pump device 100 is explained.

For example, in FIG. 1 and the like, there is shown the heat pump device 100 in which the compressor 1, the four-way valve 2, the heat exchanger 3, the expansion mechanism 4 and the heat exchanger 5 are sequentially connected by the piping. In the third embodiment, the heat pump device 100 having a more specific configuration is explained.

Figure 21:
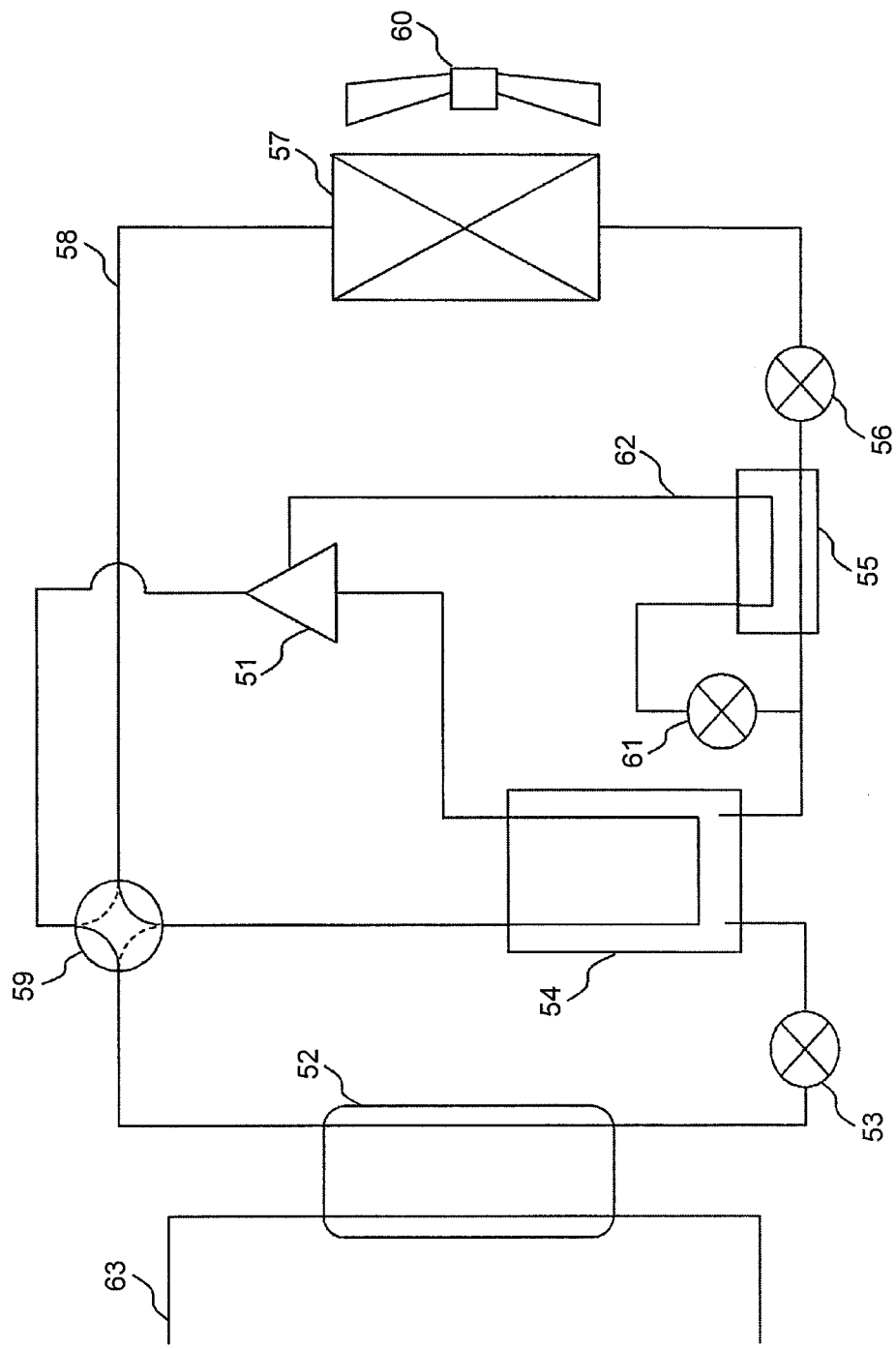
FIG. 21 is a circuit configuration diagram of the heat pump device 100 according to a third embodiment.

FIG. 21 is a circuit configuration diagram of the heat pump device 100 according to the third embodiment.

FIG. 22 is a Mollier diagram of a state of the refrigerant of the heat pump device 100 shown in FIG. 21. In FIG. 22, a specific enthalpy is indicated on a horizontal axis, and a refrigerant pressure is indicated on a vertical axis.

In the heat pump device 100, a compressor 51, a heat exchanger 52, an expansion mechanism 53, a receiver 54, an internal heat exchanger 55, an expansion mechanism 56, and a heat exchanger 57 are sequentially connected by piping, and the heat pump device 100 includes a main refrigerant circuit 58 through which the refrigerant circulates. In the main refrigerant circuit 58, a four-way valve 59 is provided on a discharge side of the compressor 51, so that a circulation direction of the refrigerant can be switched. A fan 60 is provided near the heat exchanger 57. The compressor 51 is the compressor 1 explained in the embodiment described above, and includes the motor 8 driven by the inverter 9 and the compression mechanism 7.

Furthermore, the heat pump device 100 includes an injection circuit 62 that connects from between the receiver 54 and the internal heat exchanger 55 to an injection pipe of the compressor 51 by the piping. An expansion mechanism 61 and the internal heat exchanger 55 are sequentially connected to the injection circuit 62.

A water circuit 63 in which water is circulated is connected to the heat exchanger 52. A device that uses water from a hot water dispenser, a radiator, a radiator for floor heating, or the like is connected to the water circuit 63.

An operation of the heat pump device 100 at the time of a heating operation is explained first. At the time of the heating operation, the four-way valve 59 is set in a direction of a solid line. The heating operation includes not only heating used for air conditioning but also hot-water supply for applying heat to water to make hot water.

A gas-phase refrigerant (at a point 1 in FIG. 22), which has become a refrigerant having a high temperature and a high pressure in the compressor 51, is discharged from the compressor 51, and heat exchanged by the heat exchanger 52, which is a condenser and a radiator, to be liquefied (at a point 2 in FIG. 22). At this time, water circulating in the water circuit 63 is heated by heat radiated from the refrigerant, and used for heating and hot-water supply.

The liquid-phase refrigerant liquefied by the heat exchanger 52 is pressure-reduced by the expansion mechanism 53, and becomes a gas-liquid two-phase state (at a point 3 in FIG. 22). The refrigerant, which has become the gas-liquid two-phase state in the expansion mechanism 53, is heat exchanged with the refrigerant sucked into the compressor 51 by the receiver 54, and is cooled and liquefied (at a point 4 in FIG. 22). The liquid-phase refrigerant liquefied by the receiver 54 is branched to the main refrigerant circuit 58 and the injection circuit 62 to flow therein.

The liquid-phase refrigerant flowing in the main refrigerant circuit 58 is heat exchanged with the refrigerant flowing in the injection circuit 62, which is pressure-reduced by the expansion mechanism 61 and has become the gas-liquid two-phase state, by the internal heat exchanger 55 and is further cooled (at a point 5 in FIG. 22). The liquid-phase refrigerant cooled by the internal heat exchanger 55 is pressure-reduced by the expansion mechanism 56 and becomes the gas-liquid two-phase state (at a point 6 in FIG. 22). The refrigerant, which has become the gas-liquid two-phase state in the expansion mechanism 56, is heat exchanged with ambient air by the heat exchanger 57, which is an evaporator, and is heated (at a point 7 in FIG. 22). The refrigerant heated by the heat exchanger 57 is further heated by the receiver 54 (at a point 8 in FIG. 22), and is sucked into the compressor 51.

On the other hand, as described above, the refrigerant flowing in the injection circuit 62 is pressure-reduced by the expansion mechanism 61 (at a point 9 in FIG. 22), and heat exchanged by the internal heat exchanger 55 (at a point 10 in FIG. 22). A refrigerant (injection refrigerant) in the gas-liquid two-phase state, which has been subjected to thermal exchange by the internal heat exchanger 55, flows into inside of the compressor 51 from the injection pipe of the compressor 51 keeping in the gas-liquid two-phase state.

In the compressor 51, the refrigerant sucked in from the main refrigerant circuit 58 (at the point 8 in FIG. 22) is compressed up to an intermediate pressure and heated (at a point 11 in FIG. 22). The injection refrigerant (at the point 10 in FIG. 22) joins the refrigerant compressed to the intermediate pressure and heated (at the point 11 in FIG. 22), thereby decreasing the temperature (at a point 12 in FIG. 22). The refrigerant having the decreased temperature (at the point 12 in FIG. 22) is further compressed and heated to have a high temperature and a high pressure, and is discharged (at the point 1 in FIG. 22).

When the injection operation is not performed, an aperture of the expansion mechanism 61 is fully closed. That is, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51.

The aperture of the expansion mechanism 61 here is controlled by electronic control by a control unit such as a microcomputer.

The operation of the heat pump device 100 at the time of a cooling operation is explained next. At the time of the cooling operation, the four-way valve 59 is set in a direction of a broken line. The cooling operation includes not only cooling used for air conditioning, but also drawing heat from water to make cold water, refrigeration, and the like.

The gas-phase refrigerant, which has become a refrigerant having a high temperature and a high pressure in the compressor 51 (at the point 1 in FIG. 22), is discharged from the compressor 51, and is heat exchanged by the heat exchanger 57, which functions as the condenser and the radiator, to be liquefied (at the point 2 in FIG. 22). The liquid-phase refrigerant liquefied by the heat exchanger 57 is pressure-reduced by the expansion mechanism 56, and becomes a gas-liquid two-phase state (at the point 3 in FIG. 22). The refrigerant, which has become the gas-liquid two-phase state in the expansion mechanism 56, is heat exchanged by the internal heat exchanger 55, and is cooled and liquefied (at the point 4 in FIG. 22). In the internal heat exchanger 55, the refrigerant, which has become the gas-liquid two-phase state in the expansion mechanism 56, is heat exchanged with the refrigerant (the point 9 in FIG. 22), which has become the gas-liquid two-phase state by pressure-reducing the liquid-phase refrigerant liquefied by the internal heat exchanger 55, by the expansion mechanism 56. The liquid-phase refrigerant (the point 4 in FIG. 22) heat exchanged by the internal heat exchanger 55 is branched to the main refrigerant circuit 58 and the injection circuit 62 to flow therein.

The liquid-phase refrigerant flowing in the main refrigerant circuit 58 is then heat exchanged with the refrigerant sucked into the compressor 51 by the receiver 54, and is further cooled (at the point 5 in FIG. 22). The liquid-phase refrigerant cooled by the receiver 54 is pressure-reduced by the expansion mechanism 53 and becomes the gas-liquid two-phase state (at the point 6 in FIG. 22). The refrigerant, which has become the gas-liquid two-phase state in the expansion mechanism 53, is heat exchanged by the heat exchanger 52, which functions as the evaporator, and is heated (at the point 7 in FIG. 22). At this time, because the refrigerant absorbs heat, water circulating in the water circuit 63 is cooled and used for cooling and refrigeration.

The refrigerant heated by the heat exchanger 52 is further heated by the receiver 54 (at the point 8 in FIG. 22), and is sucked into the compressor 51.

On the other hand, the refrigerant flowing in the injection circuit 62 is pressure-reduced by the expansion mechanism 61 (at the point 9 in FIG. 22) as described above, and heat exchanged by the internal heat exchanger 55 (at the point 10 in FIG. 22). A refrigerant (injection refrigerant) in the gas-liquid two-phase state, which has been heat exchanged by the internal heat exchanger 55, flows into the compressor 51 from the injection pipe of the compressor 51 keeping in the gas-liquid two-phase state.

The compression operation in the compressor 51 is the same as that of the heating operation.

When the injection operation is not performed, as in the heating operation, the aperture of the expansion mechanism 61 is fully closed, so as not to result in the refrigerant flowing into the injection pipe of the compressor 51.

In the above explanations, the heat exchanger 52 has been explained as a heat exchanger like a plate type heat exchanger that performs heat exchange between the refrigerant and water circulating in the water circuit 63. However, the heat exchanger 52 is not limited thereto, and may be other types of heat exchangers that perform heat exchange between a refrigerant and air.

The water circuit 63 may not be a circuit in which water is circulated, but may be a circuit in which another type of fluid is circulated.

As described above, the heat pump device 100 can be used for a heat pump device using an inverter compressor, such as an air conditioner, a heat pump water heater, a refrigerator, a freezer, and the like.

REFERENCE SIGNS LIST 1 compressor, 2 four-way valve, 3 heat exchanger, 4 expansion mechanism, 5 heat exchanger, 6 refrigerant pipe, 7 compression mechanism, 8 motor, 9 inverter, 10 inverter control unit, 11 high-frequency-voltage generation unit, 12 heating determination unit, 13 AC power supply, 14 rectifier, 15 smoothing capacitor, 16 bus-voltage detection unit, 17 switching element, 18 reflux diode, 19 voltage application unit, 20 current detection unit, 21 table data, 22 external input unit, 23 selection unit, 24 integrator, 25 voltage-command generation unit, 26 PWM-signal generation unit, 27 current comparison unit, 28 voltage comparison unit, 29 temperature detection unit, 30 temperature comparison unit, first logical-product calculation unit, 32 pooling determination unit, 33 elapsed-time measurement unit, 34 time comparison unit, 35 resetting unit, 36 logical-sum calculation unit, 37 second logical-product calculation unit, 38 heating-amount determination unit, 39 addition unit, 40 voltage-command correction unit, 41 carrier comparison unit, 51 compressor, 52, 57 heat exchanger, 53, 56, 61 expansion mechanism, 54 receiver, 55 internal heat exchanger, 58 main refrigerant circuit, 59 four-way valve, 60 fan, 62 injection circuit, 63 water circuit, 100 heat pump device.

The invention claimed is:
1. A heat pump device comprising:
a compressor that compresses a refrigerant;
a motor that actuates the compressor;
an inverter that applies a predetermined voltage to the motor; and
an inverter controller that controls the inverter, wherein the inverter controller includes:
a phase switching unit that changes and outputs a phase of a voltage command value of the inverter in synchronization with a reference signal having a frequency higher than an operation frequency at the time of a compression operation of the motor;
an amplitude output unit that outputs an amplitude of the voltage command value;
a voltage-command generator that generates and outputs the voltage command value based on the phase outputted by the phase switching unit and the output amplitude of the amplitude output unit;
a voltage-command calculator that corrects the voltage command value so that a DC current flowing in the motor becomes substantially zero; and
a drive-signal generator that generates a drive signal of the inverter based on the output of the voltage-command calculator.

2. The heat pump device according to claim 1, wherein the inverter is configured based on a serial connection circuit having two switching elements provided on a positive voltage side and a negative voltage side, respectively.

3. The heat pump device according to claim 1, wherein the phase switching unit switches between a phase θp and a phase θn different from the phase θp substantially by 180 degrees and outputs one of them, in synchronization with the reference signal.

4. The heat pump device according to claim 1, wherein the inverter is a three-phase inverter configured to parallel-connect three serial connection circuits for three phases,
the drive-signal generator corrects the three-phase voltage command values to generate the corrected voltage command values so that a time during which one of the switching elements on a positive voltage side of the three-phase inverter is on and the other two switching elements are off and a time during which two switching elements on the positive voltage side are on and the other one switching element is off become equal in length to each other in one cycle of the reference signal.

5. The heat pump device according to claim 1, wherein the inverter is a three-phase inverter configured to parallel-connect three serial connection circuits for three phases,
the drive-signal generator corrects the three-phase voltage command values to generate the corrected voltage command values so that a time during which all the switching elements on a positive voltage side of the three-phase inverter are on and a time during which all the switching elements on the positive voltage side are off become equal in length to each other in one cycle of the reference signal.

6. The heat pump device according to claim 3, wherein the reference signal is a signal whose top and valley can be identified,
the phase switching unit switches between the phase θp and the phase θn at timings of a top and a bottom of the reference signal, and
the voltage-command calculator corrects the three-phase voltage command values to generate the corrected voltage command values so that a time during which one of the switching elements on the positive voltage side is on and the other two switching elements are off in a period from a top to a bottom of the reference signal and a time during which two switching elements on the positive voltage side are on and the other one switching element is off in a period from a bottom to a top of the reference signal become equal in length to each other, or so that a time during which two switching elements on the positive voltage side are on and the other one switching element is off in the period from a top to a bottom of the reference signal and a time during which one of the switching elements on the positive voltage side is on and the other two switching elements are off in the period from a bottom to a top of the reference signal become equal in length to each other.

7. The heat pump device according to claim 3, wherein the reference signal is a signal whose top and valley can be identified,
the phase switching unit switches between the phase θp and the phase θn at timings of a top and a bottom of the reference signal, and
the voltage-command calculator corrects the three-phase voltage command values to generate the corrected voltage command values so that a time during which all the switching elements on the positive voltage side are on in a period from a top to a bottom of the reference signal and a time during which all the switching elements on the positive voltage side are off in a period from a bottom to a top of the reference signal become equal in length to each other, or so that a time during which all the switching elements on the positive voltage side are off in the period from a top to a bottom of the reference signal and a time during which all the switching elements on the positive voltage side are on in the period from a bottom to a top of the reference signal become equal in length to each other.

8. The heat pump device according to claim 3, wherein the phase switching unit switches between the phase θp and the phase θn and outputs one of them in synchronization with the reference signal, while changing the phase θp for each predetermined time, and changing the phase θn to a phase different from the phase θp substantially by 180 degrees in accordance with the change of the phase θp.

9. The heat pump device according to claim 1, wherein the drive-signal generator outputs a drive signal for switching on one switching element of the two switching elements and switching off the other in each serial connection part of the three-phase inverter, and
outputs a drive signal having a switching pattern for switching on any one or two of the switching elements on the positive voltage side of the three-phase inverter, on the basis of one pattern for a half cycle of the reference signal.

10. The heat pump device according to claim 1, wherein the inverter controller further includes a detector that detects a state where an outside air temperature rises by a predetermined temperature or more as compared to an outside air temperature a predetermined time prior thereto, and
the voltage-command generator outputs a voltage command value when the detector detects the state.

11. The heat pump device according to claim 1, wherein the inverter controller further includes a detector that detects that a state where the temperature of the compressor is lower than an outside air temperature has continued for a predetermined time, and
the voltage-command generator outputs a voltage command value when the detector detects the state.

12. The heat pump device according to claim 1, wherein the voltage-command generator outputs a voltage command value every time a predetermined time has passed since shutdown of the compressor.

13. The heat pump device according to claim 1, wherein a switching element that constitutes the inverter is made from a wide bandgap semiconductor or a MOSFET having a super junction structure.

14. A heat pump system comprising:
a heat pump device including a refrigerant circuit in which a compressor that compresses a refrigerant, a first heat exchanger, an expansion mechanism, and a second heat exchanger are sequentially connected by piping; and
a fluid utilization device that utilizes fluid heat-exchanged with the refrigerant by the first heat exchanger connected to the refrigerant circuit, wherein the heat pump device further includes:
a motor that actuates the compressor;
an inverter that applies a predetermined voltage to the motor; and
an inverter controller that controls the inverter, and
wherein the inverter controller includes:
a phase switching unit that switches between a phase θp and a phase θn different from the phase θp substantially by 180 degrees, and outputs one of them as a phase of a voltage command value of the inverter in synchronization with a reference signal having a frequency higher than an operation frequency at the time of a compression operation of the motor;
an amplitude output unit that outputs an amplitude of the voltage command value;
a voltage-command generator that generates and outputs the voltage command value based on the phase outputted by the phase switching unit and the output amplitude of the amplitude output unit;
a voltage-command calculator that corrects the voltage command value and outputs the corrected voltage command value; and
a drive-signal generator that generates a drive signal of the inverter based on the output of the voltage-command calculator.

15. A method for controlling an inverter in a heat pump device including:
a compressor that compresses a refrigerant;
a motor that actuates the compressor; and
an inverter that applies a predetermined voltage to the motor,
the method comprising:
a phase switching step of switching between a phase θp and a phase θn different from the phase θp substantially by 180 degrees, and outputting one of them as a phase of a voltage command value of the inverter in synchronization with a reference signal having a frequency higher than an operation frequency at the time of a compression operation of the motor;
an amplitude outputting step of outputting an amplitude of the voltage command value;
a voltage command generating step of generating and outputting the voltage command value based on the phase outputted at the phase switching step and the output amplitude of the amplitude outputting step;
a voltage-command correcting step of correcting the voltage command value and outputting the corrected voltage command value; and
a drive-signal generating step of generating a drive signal of the inverter based on the output of the voltage-command correcting step.

* * * * *